United States Patent [19]

Goossen et al.

[11] Patent Number: 5,367,617
[45] Date of Patent: Nov. 22, 1994

[54] SYSTEM AND METHOD OF HYBRID FORWARD DIFFERENCING TO RENDER BEZIER SPLINES

[75] Inventors: James A. Goossen, Bellevue; Kirk O. Olynyk, Redmond, both of Wash.

[73] Assignee: Microsoft Corporation, Redmond, Wash.

[21] Appl. No.: 909,055

[22] Filed: Jul. 2, 1992

[51] Int. Cl.$^5$ .............................................. G06F 15/62
[52] U.S. Cl. .................................................... 395/142
[58] Field of Search .................. 395/143, 142, 141; 345/132, 134, 136, 142, 144, 15, 16, 17

[56] References Cited

U.S. PATENT DOCUMENTS

| | | | |
|---|---|---|---|
| 4,620,287 | 10/1986 | Yam | 364/518 |
| 4,878,182 | 10/1989 | Aranda et al. | 364/518 |
| 4,949,281 | 8/1990 | Hillenbrand et al. | 364/518 |
| 5,185,855 | 2/1993 | Kato et al. | 395/129 |
| 5,297,294 | 3/1994 | Pomichter, Jr. | 395/143 |

OTHER PUBLICATIONS

Sheue-Ling Chang et al., "Rendering Cubic Curves and Surfaces with Integer Adaptive Forward Differencing," *Computer Graphics* 23:157–166, 1989.
James Foley et al., "Computer Graphics: Principles and Practice, Second Edition," pp. 488–491, 507–514, Addison-Wesley Publishing, 1990.
Sheue-Ling Lien et al., "Adaptive Forward Differencing for Rendering Curves and Surfaces," *Computer Graphics* 21:111–118, 1987.
Michael Shantz and Sheue-Ling Chang, "Rendering Trimmed NURBS with Adaptive Forward Differencing," *Computer Graphics* 22:189–196, 1988.
Bob Wallis, "Tutorial on Forward Differencing," pp. 594–603, Graphics Gems, ed. Andrew Glassner, Academic Press, 1990.

*Primary Examiner*—Phu K. Nguyen
*Attorney, Agent, or Firm*—Seed & Berry

[57] ABSTRACT

A high speed and memory efficient system and method for rendering Bézier curves. The system utilizes a hybrid forward differencing function representing the Bézier curve defined by the Bézier control points and renders the curve with a small number of straight line segments. The system renders the curve in a manner that results in the same Bézier control points that are calculated using recursive subdivision techniques and rejects line segment approximations that would not be derived from recursive subdivision. The system can start at either end of a Bézier curve and will render the same approximation. The method is readily implemented on a computer and is applicable to Bézier curves of any order.

55 Claims, 10 Drawing Sheets

SYSTEM AND METHOD OF HYBRID FORWARD DIFFERENCING TO RENDER BEZIER SPLINES

TECHNICAL FIELD

The present invention relates to a system and method for rendering Bézier splines. More specifically, the present invention relates to a system and method and apparatus for simulating a curve on a computer graphics system by approximating a Bézier spline with a finite sequence of straight line segments.

BACKGROUND OF THE INVENTION

Computer systems are highly useful for compiling and assimilating large amounts of data. Computer systems frequently include graphic displays capable of displaying curves. FIG. 1 illustrates a curve 2 that may be displayed on a typical graphics display system.

Graphics display systems generally include a memory for storing a digital representation of the curve to be displayed. In a primitive system this might include an extremely large memory that stores a digital value which represents the curve to be displayed. A high-resolution display system using this method would require an extremely large memory. Such a primitive system would be too slow when initially generating the digital values which represent the curve, and would also be slow when manipulating the curve, such as when the curve is rotated or relocated on the display. Because of these problems, most computer display systems utilize the Bézier spline method of modeling curves.

A Bézier spline, often referred to as a Bézier curve, is a mathematical construct for curves and curved surfaces. The most frequently used Bézier curve for two-dimensional graphic systems is the cubic Bézier curve. A cubic Bézier curve requires four control points which define the curve. Once the four points are specified, the curve is defined. However, as is well known to those skilled in the art, higher order Bézier curves may be used to create highly complex curves in two, three or higher dimensions.

To use cubic Bézier curves to construct an arbitrary curve such as curve 2 of FIG. 1, the curve may be partitioned into a number of individual arcs. This is illustrated in FIG. 1 wherein the curve 2 is divided into three arcs. Between points 4 and 6 curve 2 is divided into an arc 8, between points 6 and 10 curve 2 is divided into an arc 12, and between points 10 and 14 curve 2 is divided into an arc 16. To construct the arc 8 using a cubic Bézier curve, the arc end points 4 and 6 plus two additional points, control points 18 and 20, are selected. By properly selecting the control points 18 and 20 and the end points 4 and 6, the arc 8 can be generated using a well known reiterative process. This process is repeated for arcs 12 and 16 using their selected control points. Thus, the curve 2 can be defined by ten Bézier control points. In a similar manner, almost any desired curve can be generated from a set of selected control points using the Bézier curve technique.

While Bézier curves permit a curve to be described by a small set of data points, when the Bézier curve itself is to be displayed on a display screen the data values for the sequence of points on the display screen, called pixels, that trace out the curve must be specified. Since determining each and every data point on an arc of a curve is a slow, computationally inefficient process, it has been found highly beneficial to approximate the Bézier curve. An advantage of doing this is that the Bézier curve can be approximated very closely by a finite set of straight line segments. The number of line segments required depends upon several factors including the rate of curvature of the desired curve and the resolution of the display screen. Approximating an arc by a finite set of straight lines segments is particularly advantageous because determining the set of points comprising a line segment can be done very efficiently. The reduction of a Bézier curve into a set of straight line segments that approximates the curve, or at least an arc of the curve, is called "rendering" the curve.

Note that the above discussion is equally applicable to printers as well as display screens. The pixel size on a typical laser printer is different from the pixel size on a typical video display screen. However, the same problems encountered in rendering a Bézier curve on a display screen are present when rendering a curve on a laser printer or any other type of graphics printer, such as a vector plotter which does not use pixels.

A typical prior art method of rendering the Bézier curve is known as recursive subdivision. The process is illustrated in FIG. 2 wherein an arc 22 is to be closely approximated by a set of line segments. Two control points referred to as end points 24 and 26 of the arc 22 together with control points 28 and 30 define the arc 22 via a cubic Bézier curve. These four control points are determined in a well known manner. The initial step in rendering the curve is to determine whether the line segment 38 extending between points 24 and 26 is a "close enough" approximation to the arc 22 that the line segment 38 can be displayed as an approximation of the arc 22. If the line segment is within the resolution of the display screen (i.e., within a pixel of where the actual arc should be located on the screen), then further computations will yield no qualitative improvement in the display. The actual resolution depends on the display device. For example, on a typical video display terminal, there are 72 pixels per inch, while a laser printer has 300 or even 600 pixels per inch. Thus, the degree of accuracy of calculations depends on the display device.

The method of determining the amount of error in a recursive subdivision process is to form a line segment 38 extending between points 24 and 26. Then the magnitude of a line segment 40, perpendicular to line segment 38 and extending through control point 28, and the magnitude of a line segment 42, also perpendicular to line segment 38 but extending through point 30, are determined. The magnitudes of the line segments 40 and 42 are then checked as to whether they are both smaller than a predetermined test magnitude, such as the dimension of one pixel. If line segments 40 and 42 are both smaller than the test magnitude, the line segment 38 is deemed to be a close enough approximation of the arc 22 that it can be displayed as the arc.

However, if the magnitude of either of the line segments 40 or 42 is greater than the test magnitude, the line segment 38 is not a sufficiently accurate representation of the arc 22 and is an unsuitable approximation of the arc for display purposes. In that event, the arc 22 is subdivided into two parts, each defined by four control points. The four control points for each part are determined as follows. First, the midpoint of each of line segments 32, 34, and 36 is determined, specifically points 44, 46, and 48, respectively. Next the midpoints of line segments extending between points 44 and 46 and between points 46 and 48 are determined, specifically points 50 and 52, respectively. Finally, the midpoint of a line segment 54 extending between points 50 and 52 is determined, that point being point 56. The arc 22 passes through point 56. At point 56, the arc 22 is tangent to the line segment 54 connecting points 50 and 52. The two portions of the arc 22 can now be defined.

The first portion 22a of arc 22 is defined using points 24, 44, 50, and 56 as Bézier control points and the second portion 22b of arc 22 is defined by using points 56, 52, 48, and 26 as Bézier control points. After the two portions 22a and 22b of arc 22 are found, the line segments 60 and 62 drawn between the end points 24 and 56 and drawn between end points 56 and 26, respectively are then tested using the procedure described above to determine whether the line segments 60 and 62 are a sufficiently accurate approximation of their respective arc portions 22a and 22b that they can be used to display that portion of the arc 22. If one or more of the arc portions are not defined closely enough by line segments drawn between the respective control points, the Bézier curve for that arc portion is subdivided using the above procedure. The procedure is reiterated until each portion of the arc 22 is deemed to be closely enough approximated for display purposes by a resulting set of line segments.

By continuing the above process it is possible to approximate the arc 22 to any desired degree of accuracy. It is very important to stop the rendering of the Bézier curve when a given set of line segments approximate the arc with sufficient accuracy that a more accurate set of line segments is not required. This is because of the very large number of mathematical operations required to render a highly accurate curve, because most computer graphics systems, whether display screens or printers, are typically low resolution devices, because the amount of memory required to store the resulting set of line segments grows quickly as the accuracy of the approximation increases, and because of the finite speed of computer graphic systems.

The above prior art technique of determining when a set of line segments closely approximates a Bézier curve is computationally inefficient. The prior art technique requires the determination of the lengths of the line segments 40 and 42. It requires, in each reiteration, a calculation of the shortest distance between two Bézier control points and a line segment, such as control points 28 and 30 and the line segment 38. To do this, the location of points 57 and 58 must be determined so that the magnitudes of the line segments 40 and 42 can be calculated. Calculating the location of points 57 and 58 is computationally inefficient; this inefficiency becomes highly pronounced when performed the large number of times required by some computer graphic displays when rendering the curve.

Another prior art method of rendering a Bézier curve is to mathematically analyze the formula used to define the Bézier curve to determine if a straight line segment drawn between the Bézier end points is a sufficiently close approximation for the purposes of the user that it may be used to approximate the Bézier curve.

A Bézier curve can be represented mathematically by the generalized formula:

$$f(t) = \Sigma b_k B_k^n(t)$$

where $$B_k^n = \binom{n}{k}(1-t)^{n-k}(t^k)$$

and $$\binom{n}{k} = \frac{n!}{k!(n-k)!}.$$

The formula is valid for a Bézier curve of any order where the order of the Bézier is n. Thus, the equation for a cubic Bézier curve (n=3) is:

$$f(t) = b_0(1-t)^3 + b_1 3(1-t)^2 t + b_2 3(1-t)t^2 + b_3 t^3$$

in which $b_0$ through $b_3$ are the four Bézier control points required to define the curve. The above equation is valid for any number of dimensions. The formula is applied independently to each dimension by using vectors to define the function in each dimension. For the sake of simplicity, only a single equation is discussed. As t varies from zero to one, the function f(t) defined by the Bézier control points is traced out as shown by the curve 100 in FIG. 3A.

The parametric approach to rendering the Bézier curve initially attempts to render the curve 100 with a single straight line segment 106 drawn between the Bézier end points 102 and 104, as shown in FIG. 3A. This step may be thought of as taking a single step from Bézier end point 102, the initial position of the function f(t) at t=0, to Bézier end point 104. If the error term indicates that the line segment 106 is not accurate enough to be used as an approximation of the Bézier curve 100, prior art systems apply a mathematical operator to the function f(t) which cuts the "step size" in half so that the function now defines only the first curve portion 108 of the Bézier curve 100 as shown in FIG. 3B. The function defines the curve portion 108 between the current position at Bézier end point 102 and a new end point 116, which is the point on the curve 100 for the function f(t) where t=½. Note that the point 116 is the same point 56, at which line 54 is tangent to the arc 22 in FIG. 2.

A mathematical operator well known in the art is applied to the function f(t) to decrease the step size. This operator is often called an "Adjust Down Operator." Prior to applying the Adjust Down Operator, the function f(t) defines the entire curve 100 from the initial position at Bézier end point 102 to Bézier end point 104. After applying the Adjust Down Operator to the function f(t), the function now defines a first half portion 108 of the curve 100 from the initial position at Bézier end point 102 to the point 116 on the curve 100 for the function f(t) where t=½. Systems of the prior art will analyze the function f(t) for the one-half step size to determine if the line segment 112 drawn between end point 102 and midpoint 116 is an accurate approximation of the curve portion 108. If the line segment 112 is not sufficiently accurate to approximate the curve portion 108, the system decreases the step size again by applying the Adjust Down Operator to the function f(t) a second time. The function f(t) now defines the first quarter portion 118 of the curve 100 from the initial position at Bézier end point 102 to the midpoint 122 of the curve portion 108 as shown in FIG. 3C (the second quarter portion being indicated by the reference numeral 124). The step size continues to be decreased by one-half until the line segment is sufficiently accurate to be an adequate approximation of a portion of the curve.

At that point in time, systems of the prior art apply a different operator, commonly called a "Step Forward Operator," to the function f(t). The Step Forward Operator effectively moves the current position of the function by an amount equal to the current step size. For example, if a line segment 120 in FIG. 3C drawn between end point 102 and point 122 were determined to be sufficiently accurate to approximate the curve portion 118, the system will use the line segment 120 to approximate the curve portion 118 and apply the Step Forward Operator to the function f(t) to move the function to the point 122 on the curve. Prior to applying the Step Forward Operator, the function f(t) defines the curve portion 118 from the initial position at Bézier end point 102 to the end point 122. After applying the Step Forward Operator, the current position of the function f(t) is moved to the end point 122; the function now defines the curve portion 124 from the current position at point 122 to the end point 116. Note that the step size of the function has not been altered by applying the Step Forward Operator. Prior art systems will apply the same process to the function f(t) for the curve portion 124, applying the Adjust Down Operator if necessary, or applying the Step Forward Operator if the line segment 126 is close enough to the curve portion 124 that the line segment 126 can be used to approximate the curve portion 124.

If the line segment 126 is sufficiently accurate to approximate the curve portion 124, the system will apply a third operator, commonly called an "Adjust Up Operator" to the function f(t) which doubles the step size of subsequent applications of the Forward Step Operator. The step size is doubled by the Adjust Up Operator. Prior to applying the Adjust Up Operator, the function f(t) defines the curve portion 124 from the current position at end point 122 to end point 116. After applying the Adjust Up Operator, the function defines a double sized curve portion 124 and 128 from the current position at end point 122 to a new end point 132 as shown in FIG. 3D. Thus, the system will determine if a line segment 130 drawn between point 122 and point 132 is a sufficiently accurate approximation of the curve portions 124 and 128. If the line segment 130 is sufficiently accurate to approximate the curve portions 124 and 128, the system uses the line segment 130 and applies the Step Forward Operator to the function f(t) to move the current location of f(t) to point 132 at the end of line segment 130. This process of halving or doubling the step size as the function moves along the Bézier curve is known in the art as adaptive forward differencing (AFD).

Ideally, AFD will render the curve 100 with a minimum number of line segments. As will be discussed in greater detail below, this does not occur because of the difficulty in evaluating the error terms of the function f(t).

As is well known in the art, the formula for AFD is merely a manipulation of the generalized Bézier formula. The manipulation, called a change in the basis, results in the following formula for the AFD basis:

$$f(t) = a_0 A_0(t) + a_1 A_1(t) \ldots + a_k A_k(t)$$

where $A_k(t) = ((t-k+1)/k)^* A_{k-1}(t)$, $A_0(t) = 1$. For the cubic Bézier curve, the most commonly used curve, the factors $A_0$ through $A_3$ are given by the following equations:

$$A_0(t) = 1$$

$$A_1(t) = t$$

$$A_2(t) = \tfrac{1}{2}(t)(t-1)$$

$$A_3(t) = 1/6(t)(t-1)(t-2)$$

where the function is expressed in terms of the AFD factors. To evaluate the function at time, t=t+1, it is possible to use the following equations:

$$A_0(t+1) = 1 = A_0(t)$$

$$A_1(t+1) = A_0(t) + A_1(t)$$

$$A_2(t+1) = A_1(t) + A_2(t)$$

$$A_3(t+1) = A_2(t) = A_3(t)$$

to express the function f(t+1) in terms of the function f(t). One can apply the Forward Step Operator to evaluate the function f(t+1) in terms of the function f(t). The following equation expresses the function f(t+1) in the AFD basis:

$$f(t+1) = (a_0 + a_1)A_0(t) + (a_1 + a_2)A_1(t) + (a_2 + a_3)A_2(t) + (a_3)A_3(t)$$

resulting in the equation:

$$f(t+1) = (a_0')A_0(t)A_0(t) + (a_1')A_1(t) + (a_2')A_2(t) + (a_3')A_3(t)$$

where $a_0 + a_1 = a_0'$, $a_1 + a_2 = a_1'$, $a_2 + a_3 = a_2'$, and $a_3 = a_3'$. Note that f(t+1) can be evaluated by using the vector terms $a_0'$ through $a_3'$.

The use of simple operators applied to the function f(t) will increase the computational efficiency of rendering a Bézier curve. Thus, the mathematical approach of AFD to rendering a Bézier curve is an improvement over the graphical techniques previously described. However, the system is still faced with the problem of determining how many subdivisions are necessary to render a satisfactory approximation of the Bézier curve. Using the techniques of AFD, an error term can be calculated. But, the error term of the AFD equation is difficult to evaluate. As a result, prior art systems resort to an alternative method of determining the accuracy of the rendered curve. The most common approach in AFD is to subdivide repeatedly until each line segment is no greater than a selected test magnitude which is often selected as being one pixel in length. Thus, the curve is repeatedly subdivided and the length of the line segment, calculated by the equation $a_0' - a_0$, is no greater than a pixel long.

There are several disadvantages to using AFD to subdivide until line segments are no greater than one pixel long. The most obvious disadvantage is that many more subdivisions may be performed than are actually required to render an accurate approximation of a Bézier curve, since often a line segment several pixels long provides a suitable approximation, particularly for very flat curves and straight lines.

Another disadvantage of AFD is that the points generated by the AFD technique are not always the same as the points generated by the recursive subdivision method of the prior art described above. Note that recursive subdivision would never have resulted in line segment 130 being used to approximate curve portions 124 and 128 in FIG. 3D. Since recursive subdivision always subdivides the curve in half, the point 116 will be the end point of a line segment used to approximate the curve 100. Thus, recursive subdivision will always result in point 116 being a Bézier control point while the AFD techniques may result in a line segment that does not use point 116 as a control point for the function f(t).

Because the control points may be different, the AFD technique is not guaranteed to be bidirectional, that is the Bézier control points generated starting at one end of the Bézier curve are not necessarily the same control points that are generated starting from the other end of the curve. Erasure of a graphic image using AFD requires that the system start at the same end of the curve for erasing as for creating a curve. This is a disadvantage when erasing a curve from a computer display screen since it may often be more efficient to erase from the other end of the Bézier curve.

The recursive subdivision method has the advantage that it is not directionally dependent. The same Bézier control points are generated when starting at either end of the Bézier curve. The recursive subdivision method has the disadvantage that it is computationally inefficient in rendering a curve as discussed above.

Therefore, it would be useful to have a computationally efficient system and method of rendering Bézier curves and determining the accuracy with which the resulting straight line segments approximate the curve.

SUMMARY OF THE INVENTION

A system for rendering Bézier curves in a computationally efficient manner. The system measures the degree of accuracy with which a straight line segment between the end points of the curve approximates the curve. The system calculates error vectors and compares the magnitude of the error vectors with a test magnitude, which is indicative of the desired degree of accuracy with which the Bézier curve should be rendered. If the magnitude of any of the error vector terms exceeds the test magnitude, the system applies a mathematical operator to decrease the size of the curve portion being rendered and repeats the test for accuracy. If the magnitude of the error vectors are each less than the test magnitude, the system will test a larger curve portion to determine if a larger line segment can be used to approximate the larger curve portion. The system will only utilize the larger line segment if the line segment would be derived by recurslye subdivision. Otherwise, the system uses the smaller line segment to approximate a smaller curve portion.

Other features and advantages of the present invention will become apparent from the following more detailed description, taken in conjunction with the accompanying drawings.

DETAILED DESCRIPTION OF THE INVENTION

The present invention relates to a system and method for rendering a Bézier curve with the same set of line segments that would be generated by the commonly used recursive subdivision prior art method using the same error metric. The system and method of the present invention renders a Bézier curve in a computationally efficient manner. As with related prior art methods, the present invention requires that an accuracy value, hereinafter called the test magnitude, be predetermined. The test magnitude determines if the degree of accuracy with which the line segments approximate the Bézier curve is adequate for the user. The actual value of the test magnitude is usually selected in relation to the resolution of the graphics display screen or printer being used, such as the size of a pixel, although any test magnitude value can be used. If the line segments fall within a pixel of the actual curve, then the system can end the calculations because additional calculations will not yield a more meaningful approximation. As previously discussed, the degree of resolution depends on the display device with a pixel on a video display having a different physical size than a pixel on a typical laser printer. The present invention works equally well with display devices of any resolution.

The system of the present invention, referred to as hybrid forward differencing (HFD), allows a Bézier curve to be rendered in a computationally efficient manner because it subdivides only as often as necessary to render a curve as accurately as required by the particular graphics display. The system uses some of the advantages provided by the computational efficiency of AFD, but generates lines instead of pixels because the present invention calculates error vectors that are used to minimize the number of subdivisions. The system also reproduces the exact same Bézier control points that are generated by the well known recursive subdivision method. This is a great advantage when erasing a curve from a display screen because the erasure process can proceed from either end of the Bézier curve without regard for the direction the curve was originally drawn. In addition, the system of the present invention uses a unique vector error approach to analyzing the accuracy of the rendered Bézier curve.

Figure 4:
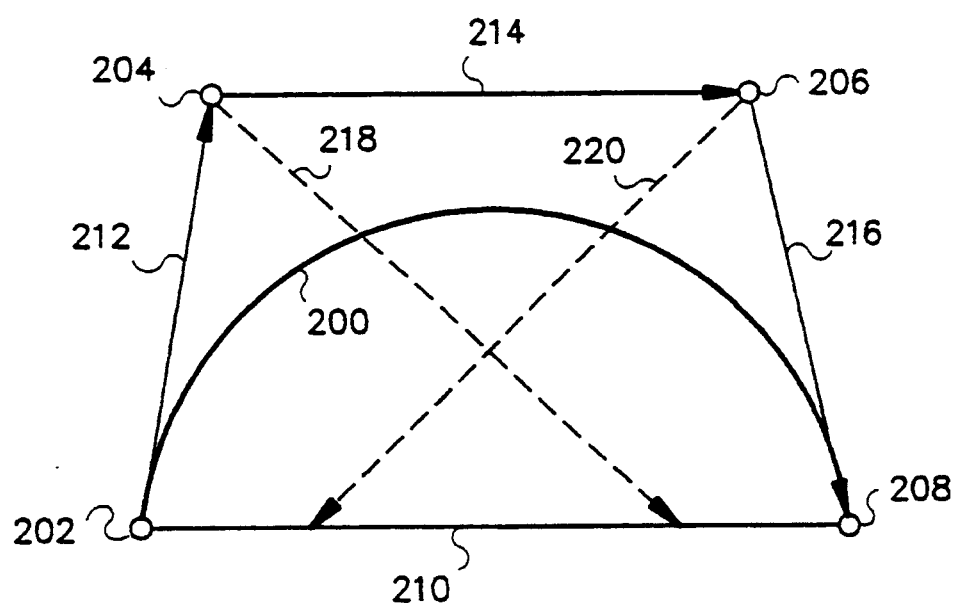
FIG. 4 illustrates a graphical calculation of the error vectors used in the present invention.

The use of error vectors can best be shown by the graphical depiction in FIG. 4. A cubic Bézier curve 200, which is defined by four Bézier control points 202, 204, 206, and 208, can be approximated by a single line segment 210 drawn between the two Bézier end points 202 and 208. To determine the accuracy of this approximation, the system calculates vectors 212, 214, and 216 between the four Bézier control points. It should be noted that this process is applicable to Bézier curves of any order, with the only difference being the number of error vectors generated by the system. For example, a third order Bézier curve results in two error vectors, as will be described below, while a second order Bézier curve results in a single error vector. A fourth order Bézier curve results in three error vectors.

The system calculates for Bézier curve 200 a pair of error vectors 218 and 220, which can be calculated by simple addition and subtraction of the vectors 212, 214, and 216 drawn between the four Bézier control points 202, 204, 206, and 208 in FIG. 4. Specifically, error vector 218 is calculated by subtracting vector 212 from vector 214 and error vector 220 is calculated by subtracting vector 214 from vector 216. In FIG. 4, the error vectors 218 and 220 are shown originating from control points 204 and 206, respectively. The magnitudes of the two error vectors 218 and 220 are each compared to the test magnitude. If the magnitude of either error vector exceeds the test magnitude, the approximation is not sufficiently accurate and the curve must be subdivided. On the other hand, if the magnitude of the error vectors 218 and 220 are both less than the test magnitude, the line segment 210 drawn between Bézier end points 202 and 208 is sufficiently accurate that it may be used to approximate the Bézier curve 200.

It should be noted that there are numerous methods known to those of ordinary skill in the art for calculating the magnitude of the error vectors. One way to calculate the magnitude of an error vector is to resolve the error vector into its respective X and Y components and calculate the square root of the sum of the squares of the X and Y components of the vector. In the presently preferred embodiment, the system does not calculate the actual magnitude of the error vector. Instead, the larger of the X or Y component of each error vector is used as an approximation of that error vector. Thus, the magnitude (or scalar component) of the largest X or Y component of each of the error vectors 218 and 220 is compared to the test magnitude.

While these error vectors can be used to calculate the degree of accuracy with which the line segment 210 approximates the Bézier curve 200, the calculation of the vectors 212, 214, and 216, as well as the calculation of the error vectors 218 and 220 themselves, can be a slow process. The system of the present invention determines these error vectors without the need for the calculation of vectors between the Bézier control points.

As previously discussed, the AFD basis formula is represented by the equation:

$$f(t) = a_0 A_0(t) + a_1 A_1(t) \ldots + a_k A_k(t)$$

where $a_0$ through $a_k$ are vectors representing a direction in space. The HFD scaled error basis for a cubic polynomial is represented by the equation:

$$f(t) = e_0 E_0(t) + e_1 E_1(t) + e_2 E_2(t) + e_3 E_3(t)$$

where
$$E_0(t) = A_0(t) = 1$$

$$E_1(t) = A_1(t) = t$$

$$E_2(t) = A_2(t) + A_3(t) = 1/6(t)(t^2 - 1)$$

$$E_3(t) = -A_3(t) = -1/6(t)(t-1)(t-2)$$

which results in a Forward Step Operator that is easy to evaluate. The error vectors $e_0$ through $e_3$ can be related to the Bézier control points by the following equations:

$$e_0 = b_0$$

$$e_1 = b_3 - b_0$$

$$e_2 = 6(b_ - 32b_2 + b_1)$$

$$e_3 = 6(b_2 - 2b_1 + b_0)$$

where $b_0$ through $b_3$ are the Bézier control points. These equations represent vectors that can be used to evaluate the accuracy of the line segment approximation of the Bézier curve. Specifically, vectors $e_2$ and $e_3$ are six times vectors 218 and 220 in FIG. 4. Thus, the error vectors, which were graphically derived in FIG. 4, can be derived from the above equations. By altering the basis of the equations, the task of determining an error term becomes simple. The magnitudes of error vectors $e_2$ and $e_3$ are compared to the test magnitude. As previously discussed, the magnitude of an error vector can be approximated by the larger of the scalar components of the error vector. If the magnitudes of both error vectors $e_2$ and $e_3$ are less than the test magnitude, then the line segment drawn between the two Bézier end points can be used to approximate the Bézier curve. It should be noted that the principles of the present invention are equally applicable to Bézier curves of any order, with the only difference being the number of error vectors produced. For a cubic Bézier curve, there are two error vectors $e_2$ and $e_3$, while a fourth order Bézier curve would have three error vectors $e_2$, $e_3$ and $e_4$ which all need to be compared to the test magnitude. In contrast, a second order Bézier curve will have only a single error vector $e_2$ to be compared with the test magnitude. Thus, a cubic Bézier curve is discussed, the invention is applicable to Bézier curves of any order.

The following description is given as an example of the process of deriving the unique error vectors to test the accuracy of line segment approximations of a cubic Bézier curve. The flowchart of FIGS. 5A-5C, in conjunction with FIGS. 6A-6E, provides a step by step description of the method used by the present invention. The system is provided with the values for the Bézier control points. These points may be inputted to the computer by a variety of means such as a graphics application program or the like. In the case of a cubic Bézier curve, there are four control points $b_0$ through $b_3$, which are inputs to the system. The system uses the Bézier control points to calculate a function, f(t), defined in terms of $e_0$ through $e_3$ of the HFD scaled error basis described above. For example, in the flowchart of FIG. 5A, the system is provided with the values for the Bézier control points at the start 300. The system uses the Bézier control points to calculate a function f(t) defined in terms of $e_0$ through $e_3$ of the HFD scaled error basis described above. The function f(t) defines the curve 400 in FIG. 6A. The end points 402 and 404 are the Bézier end points $b_0$ and $b_3$, respectively. The other two Bézier control points have been omitted for clarity.

The system initially sets a variable representing the number of steps, nsteps, equal to one as shown in block 302. This variable represents the number of steps required for the function f(t) to reach from the current position to the Bézier end point using the present step size. Initially, the function defines the entire curve. Thus, it would take a single step to reach from one Bézier end point 402 to the other Bézier end point 404 at the initial step size. In block 304, the system calculates error vectors for the present portion of the curve, which is initially the entire Bézier curve. The system uses error vectors $e_2$ and $e_3$ of the function f(t) to determine if a single line segment 406 is a sufficiently accurate approximation of the curve 400 defined by the four inputted Bézier control points. As previously discussed, the magnitude of an error vector can be approximated by the larger of the scalar components of the error vector. If the error vectors $e_2$ and $e_3$ are both less then the test magnitude, then the single line segment 406 generated between the two Bézier end points 402 and 404 is an accurate approximation of the Bézier curve 400.

Figure 1:
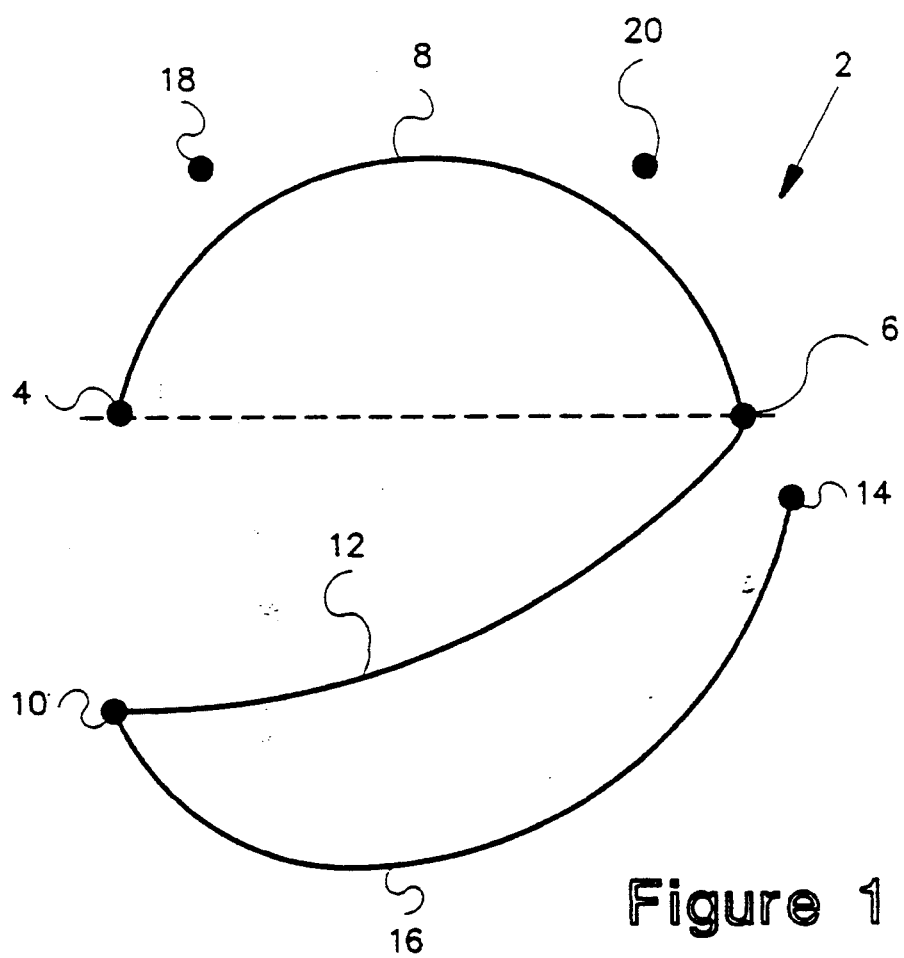
FIG. 1 is an illustration of how an arbitrary curve can be subdivided into a subset of smaller arcs.
Figure 2:
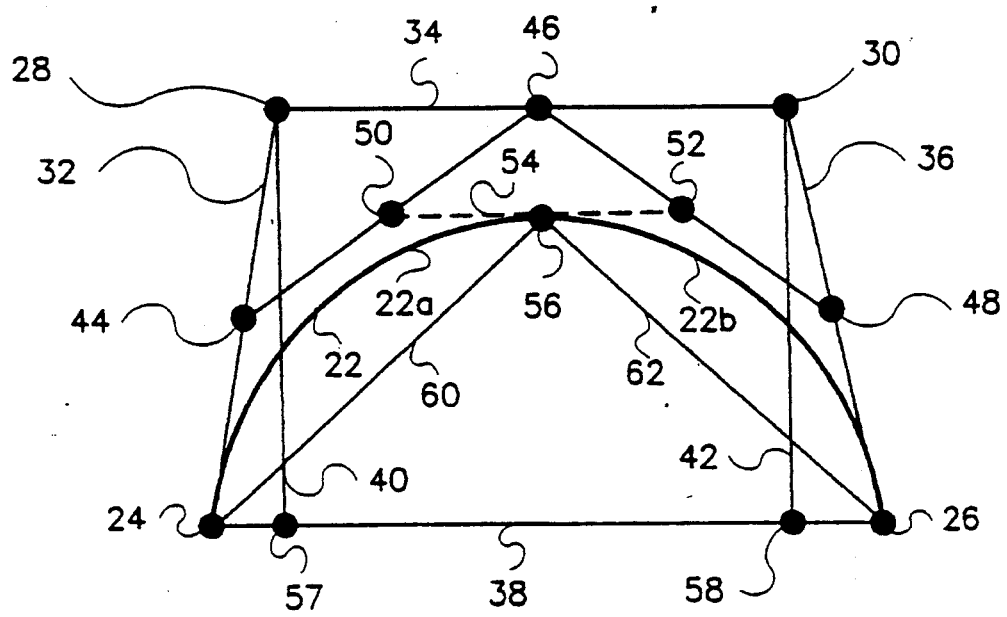
FIG. 2 illustrates an arc of the curve of FIG. 1 defined by a cubic Bézier curve, how that arc can be approximated by a set of individual line segments spanning Bézier end points, and how a prior art method checks the approximation for accuracy.
Figure 3A:
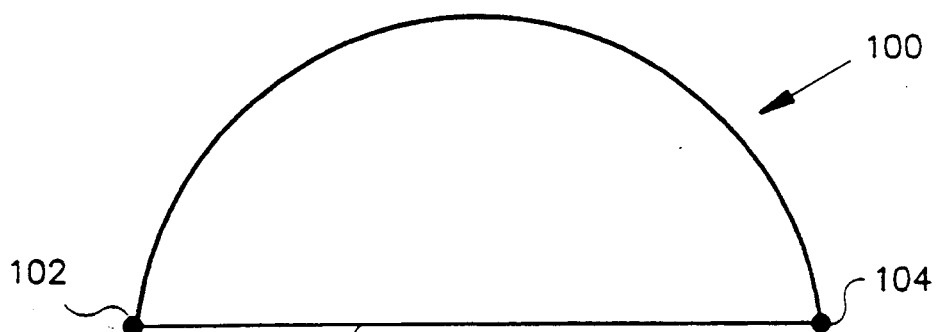
FIG. 3A illustrates the curve of FIG. 2 and a first approximation of the curve using prior art techniques.
Figure 3B:
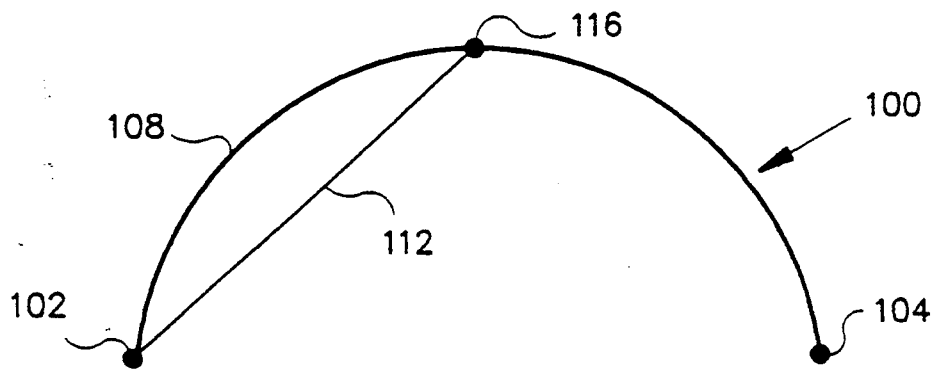
FIG. 3B illustrates the curve of FIG. 3A which has been subdivided in half by a prior art method.
Figure 3C:
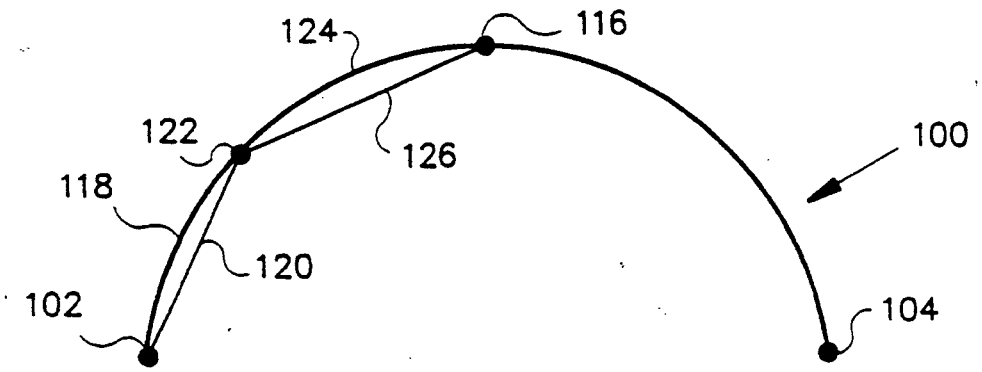
FIG. 3C illustrates the curve of FIG. 3B and a portion thereof which has again been further subdivided according to the principles of the prior art.
Figure 3D:
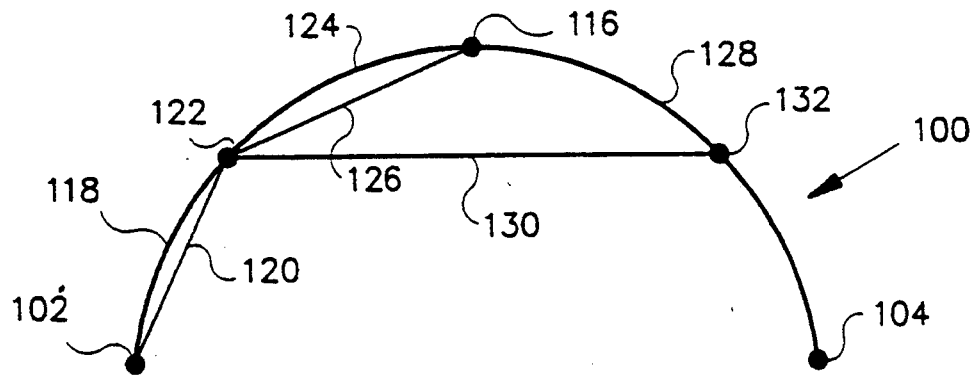
FIG. 3D illustrates the curve of FIG. 3C and the use of a larger line segment according to the principles of the prior art.

If either of the error vectors are greater than the test magnitude, the result of decision 306 is YES. In that case, the Adjust Down Operator is applied to the function f(t) in block 308, which cuts the step size in half. This type of operator is also well known in the art and will not be described in great detail. In the presently preferred embodiment, the following matrix is used to evaluate the function f(t/2) in terms of f(t):

$$\begin{bmatrix} e_0' \\ e_1' \\ e_2' \\ e_3' \end{bmatrix} = \begin{bmatrix} 1 & 0 & 0 & 0 \\ 0 & 1/2 & -1/16 & -1/16 \\ 0 & 0 & 1/8 & 1/8 \\ 0 & 0 & 0 & 1/4 \end{bmatrix} \begin{bmatrix} e_0 \\ e_1 \\ e_2 \\ e_3 \end{bmatrix}$$

where $e_0'$ through $e_3'$ are the terms of the function f(t/2) and $e_0$ through $e_3$ are the terms of the function f(t). Application of the Adjust Down Operator alters the function f(t) so that it now defines only the curve portion 408 (i.e., the first half of Bézier curve 400) from the current position at Bézier end point 402 to a new end point 416 defined by the function f(t/2) in FIG. 6B. We have shown that the application of the Adjust Down Operator effectively creates a new function f(t/2). The terms $e_0'$ through $e_3'$ are the terms of the function f(t/2). A second application of the Adjust Down Operator would result in a function f(t/4) expressed in terms of $e_0''$ through $e_3''$. For the sake of clarity, we will hereafter redefine an operated function as a function f(t) expressed in terms of $e_0$ through $e_3$. This avoids the problem of having terms such as $e_0'$, $e_0''$, $e_0'''$, etc. Although it is obvious to those skilled in the art, it should be explicitly stated that the original function f(t) is not the same as the function f(t) after the application of an operator. Similarly, the terms $e_0$ through $e_3$ of the new function f(t) are not the same as the terms $e_0$ through $e_3$ of the original function. It should be noted that the point 416 is the point of the curve 400 for the function f(t) where t=½. This point corresponds to the point 56 in FIG. 2. Block 310 doubles the value of nsteps indicating that it would take two steps, at the present step size, to reach the Bézier end point 404 from the current position at Bézier end point 402. The system returns control to block 304, which determines error vectors for the function f(t), which now represents the first curve portion 408 of the Bézier curve, and the process is repeated. The system tests to determine if line segment 412 extending between points 402 and 416 is accurate enough to approximate the curve portion 408. The function f(t), which now represents the curve portion 408, will have new error vectors $e_2$ and $e_3$ representing the error for a line segment 412 extending between the first Bézier end point 402 and the midpoint 416 on the curve 400.

If both of the error vectors $e_2$ and $e_3$ representing the error for a line segment 412 are less than the test magnitude, the line segment 412 may be used to approximate the curve portion 408. However, if either of the error vectors $e_2$ or $e_3$ are greater than the test magnitude, then line segment 412 cannot be used to approximate the curve portion 408. In that event, the system will apply the Adjust Down Operator to the function f(t) to divide the step size in half again. The function now defines only the first quarter portion 418 of the entire curve 400. After the Adjust Down Operator has been applied, the error vectors $e_2$ and $e_3$ of the function f(t) are indicative of the accuracy with which the line segment 420, extending between points 402 and 422, approximates the curve portion 418. The steps of error checking, applying the Adjust Down Operator, and doubling the value of nsteps repeat until the error vectors for a particular portion of the curve are all less than the test magnitude. In that case, the result of decision 306 will be NO.

Figure 5A:
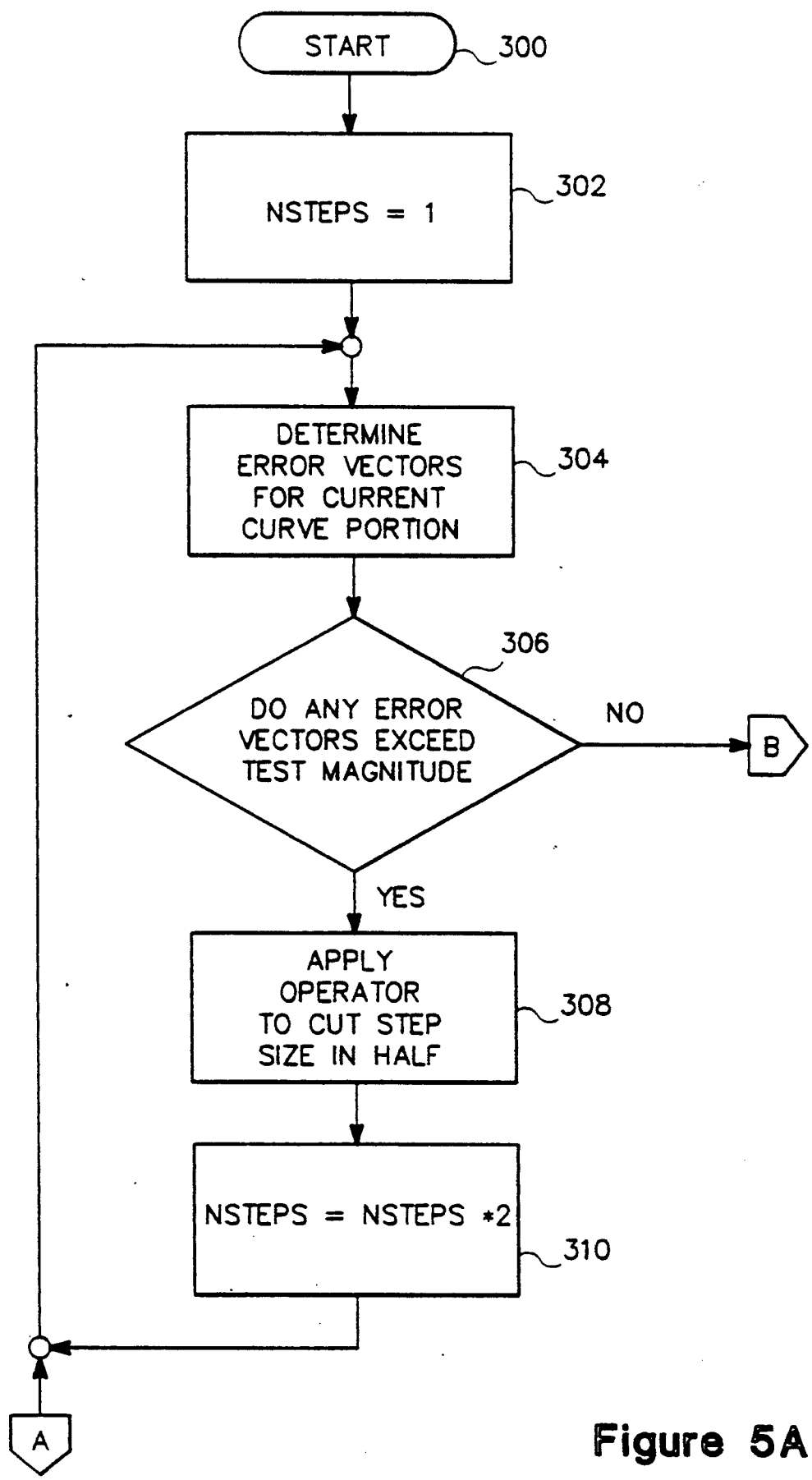
FIG. 5A is a flowchart according to the principles of the present invention.
Figure 5B:
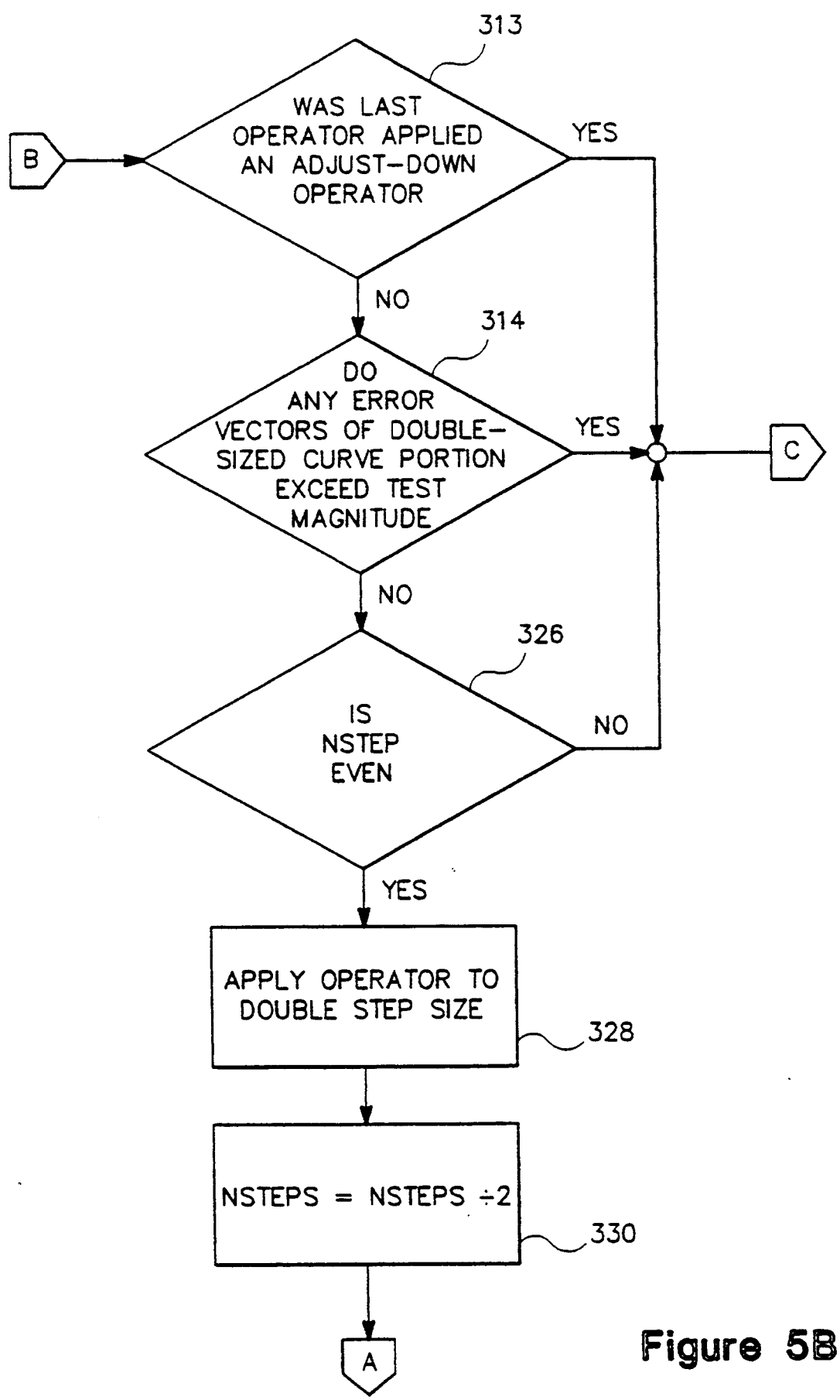
FIG. 5B is a continuation of the flowchart of FIG. 5A.
Figure 5C:
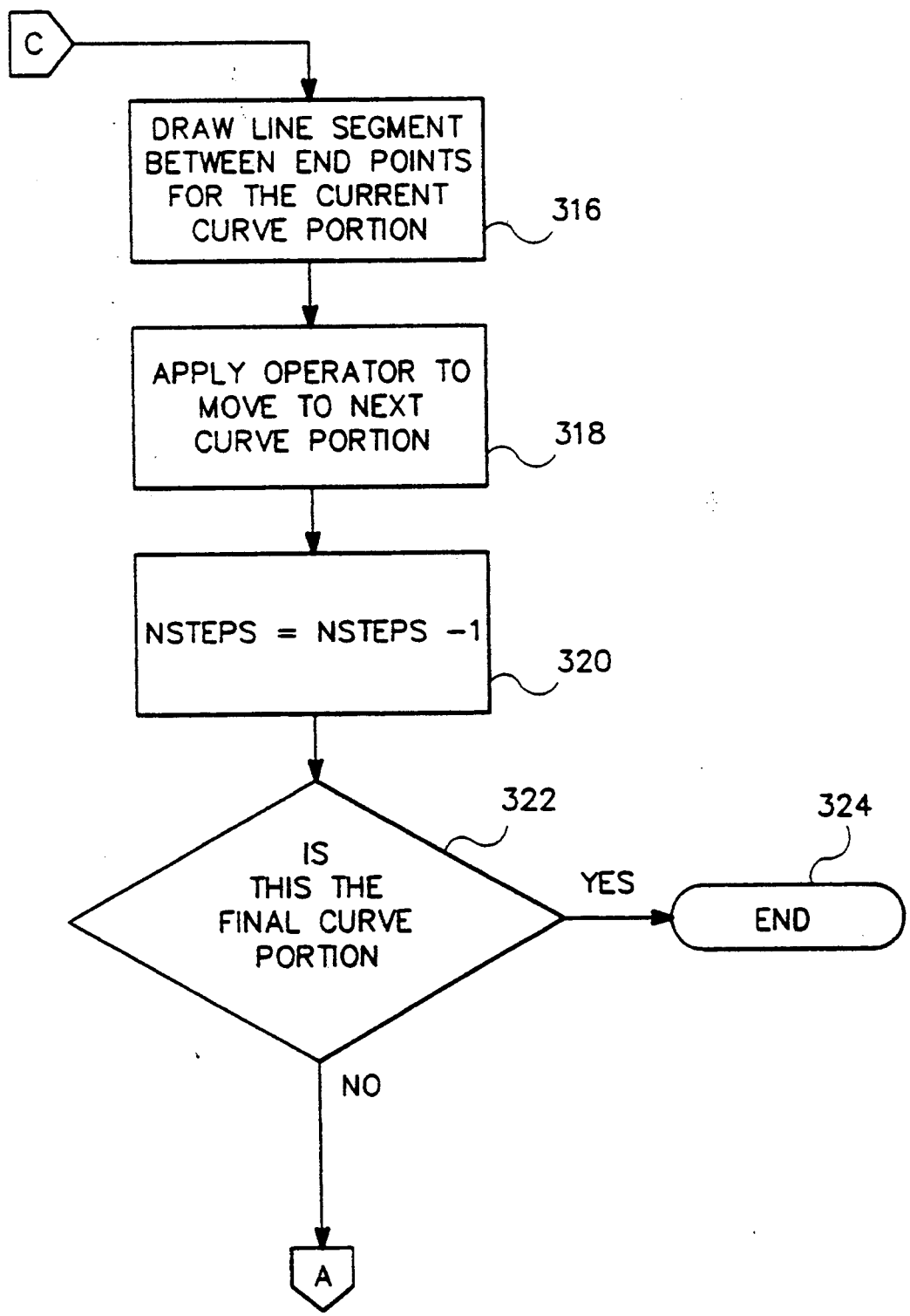
FIG. 5C is a continuation of the flowchart of FIG. 5B.

Once the system determines that the error vectors $e_2$ and $e_3$ are both less than the test magnitude, the system generates a line segment 420 between the two end points 402 and 422 of the current portion of the Bézier curve in block 316, as shown in FIG. 5C, and then moves to the next portion of the Bézier curve in block 318 by applying the Forward Step Operator to the function f(t). The general form of the Forward Step Operator is well known in the art and is not described in detail here. In the presently preferred embodiment, the following matrix is used to evaluate the function f(t+1) in terms of f(t):

$$\begin{bmatrix} e_0' \\ e_1' \\ e_2' \\ e_3' \end{bmatrix} = \begin{bmatrix} 1 & 1 & 0 & 0 \\ 0 & 1 & 1 & 0 \\ 0 & 0 & 2 & -1 \\ 0 & 0 & 1 & 0 \end{bmatrix} \begin{bmatrix} e_0 \\ e_1 \\ e_2 \\ e_3 \end{bmatrix}$$

where $e_0'$ through $e_3'$ are the terms of the function f(t+1) and $e_0$ through $e_3$ are the terms of the function f(t). As previously discussed, we will redefine the function f(t+1) as a new function f(t) with new terms $e_0$ through $e_3$.

Before the Forward Step Operator is applied, the function f(t) defines the curve portion 418 extending from the current position at Bézier end point 402 to the end point 422. After the Forward Step Operator has been applied to the function f(t), the function has a current position at point 422 and defines the curve portion 424 from point 422 to point 416. The system also decrements the value of nsteps to three in block 320. This indicates that it would take three steps, at the current step size, to reach Bézier end point 404 from the current position at point 422. Note that the step size remains unchanged by the application of the Forward Step Operator. Decision 322 checks to see if the segment just rendered is the last segment on the Bézier curve. If nsteps equals zero, the last curve portion has been rendered and the result of decision 322 is YES. The entire Bézier curve has been rendered and the system ends the rendering process at block 324. If the result of decision 322 is NO, the system returns control to block 304, in FIG. 5A, which again calculates error vectors for the current curve portion.

To render the curve portion 424, the system repeats the above-described process of calculating error vectors and comparing the magnitude of the error vectors to the test magnitude. If either of the error vectors $e_2$ or $e_3$ is larger than the test magnitude, the system applies the Adjust Down Operator to cut the step size in half. If the error vectors of the curve portion 424 do not exceed the test magnitude, then the result of decision 306 is NO. The line segment 426 between the end points 422 and 416 could be used to approximate the Bézier curve. Before generating the line segment 426 to approximate the curve portion 424, the system will check to see if a longer line segment can be used to approximate a larger portion.

In addition to the Adjust Down Operator and the Forward Step Operator described above, the present invention uses an Adjust Up Operator which can be applied to the function f(t) to double the step size. This operator is also well known to those of ordinary skill in the art and will not be discussed in great detail. In the presently preferred embodiment, the following matrix is used to evaluate the function f(2t) in terms of f(t):

$$\begin{bmatrix} e_0' \\ e_1' \\ e_2' \\ e_3' \end{bmatrix} = \begin{bmatrix} 1 & 0 & 0 & 0 \\ 0 & 2 & 1 & 0 \\ 0 & 0 & 8 & -4 \\ 0 & 0 & 0 & 4 \end{bmatrix} \begin{bmatrix} e_0 \\ e_1 \\ e_2 \\ e_3 \end{bmatrix}$$

where $e_0'$ through $e_3'$ are the terms of the function f(2t) and $e_0$ through $e_3$ are the terms of the function f(t). Again, we will redefine f(2t) as a new function f(t) with new terms $e_0$ through $e_3$ following the application of the Adjust Up Operator. By doubling the step size, the system is approximating a larger portion of the Bézier curve. The Adjust Up Operator is applied to the function if the error is smaller than the test magnitude for the particular portion of the Bézier curve being rendered. Both prior art systems and the system of the present invention can test to determine if a larger step size exceeds the test magnitude. When a prior art system finds that the error for the double-step size does not exceed the test magnitude, the prior art system doubles the step size. Systems of the prior art increase the step size regardless of whether the resulting Bézier control points would be the same as Bézier control points derived from the recursive subdivision method. In contrast, the system of the present invention will not double the step size even if the error for the double-step size does not exceed the test magnitude unless the resulting Bézier control points would be the same as those resulting from the recursive subdivision method.

Figure 6A:
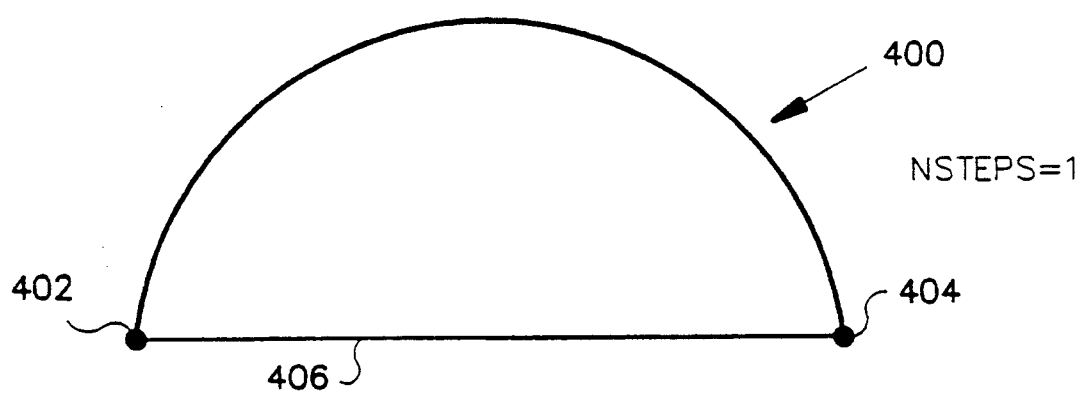
FIG. 6A illustrates the curve of FIG. 2 and a first approximation of the curve using the present invention.
Figure 6B:
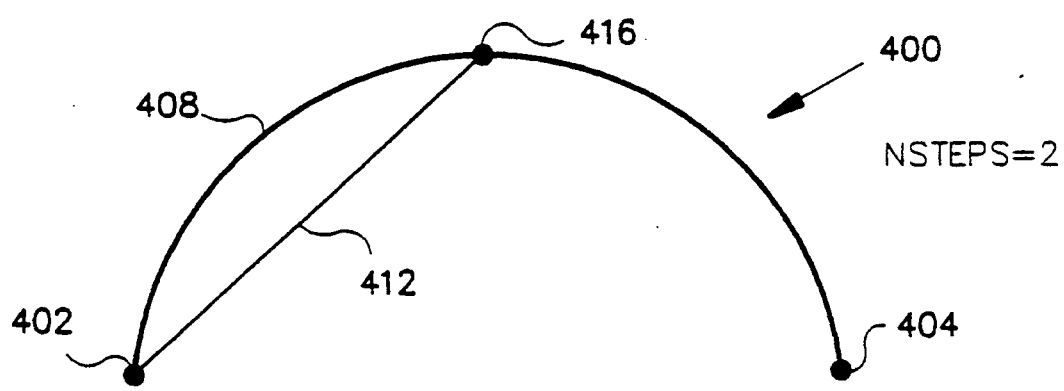
FIG. 6B illustrates the curve of FIG. 6A which has been subdivided in half.
Figure 6C:
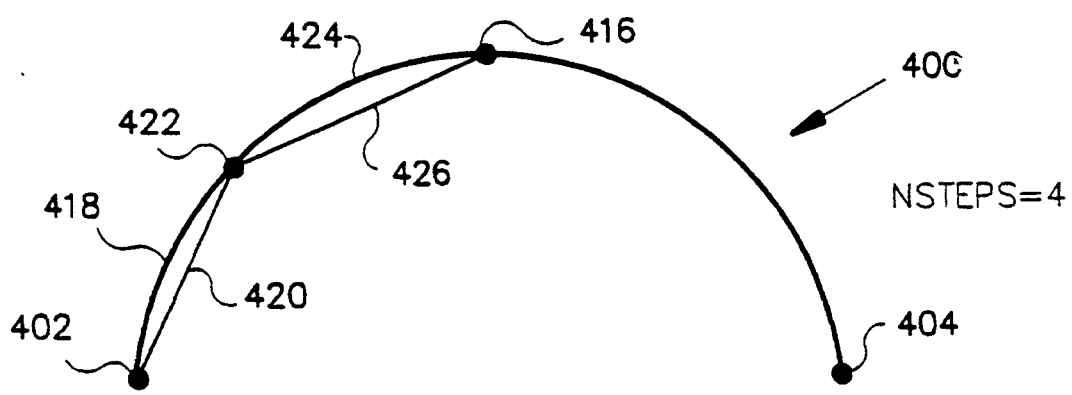
FIG. 6C illustrates the curve of FIG. 6B and a portion thereof which has again been subdivided according to the principles of the present invention.
Figure 6D:
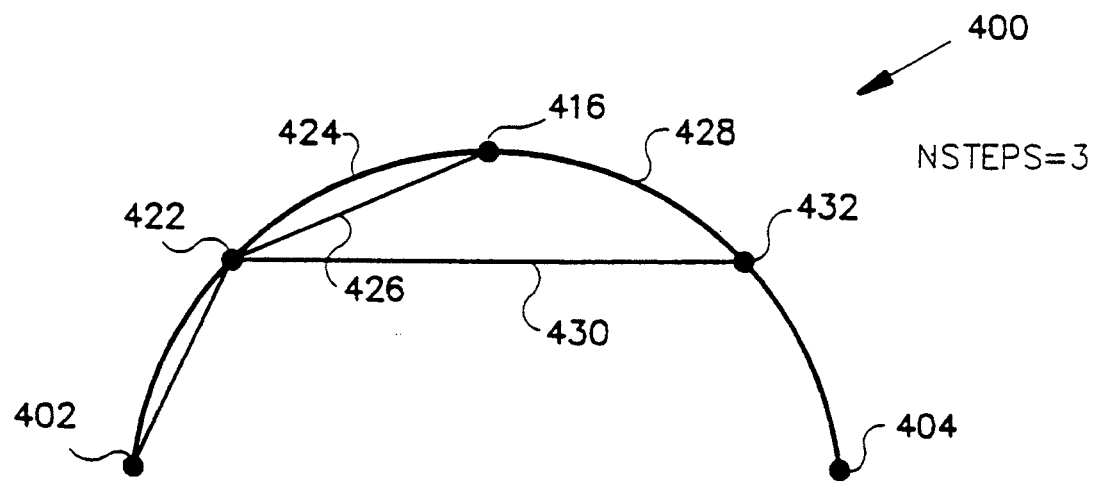
FIG. 6D illustrates the curve of FIG. 6C and a rejection of a line segment according to the principles of the present invention.

Whenever the magnitude of the error vectors $e_2$ and $e_3$ for the current rendered portion of the Bézier curve are both less than the test magnitude, the system tests a curve portion that is twice the size of the rendered curve portion to see if the Adjust Up Operator should be applied to the function. The system will not check a double-sized curve portion if the last operator applied to the function f(t) was the Adjust Down Operator because prior use of the Adjust Down Operator is an indication that the double-sized curve portion cannot be approximated by a single straight line segment. On the other hand, if the system has previously applied the Forward Step Operator without an intervening application of the Adjust Down Operator, then the system will test to determine if the Adjust Up Operator can be applied. The system will only apply the Adjust Up Operator if the error vectors for the double-sized curve portion are less than the test magnitude and if the double-sized curve portion is one that would be derived using the recursive subdivision process of the prior art. The system can determine the error vectors $e_2$ and $e_3$ for the double-sized curve portion without the need for applying the Adjust Up Operator. The system need only calculate $e_2'$ and $e_3'$ from the matrix above to determine the error vectors for the double-sized curve portion. The system will not apply the Adjust Up Operator if either of the error vectors $e_2$ or $e_3$ of the double-sized curve portion are greater than the test magnitude or if the line segment would not be derived by recursive subdivision. If the system determines that the line segment 426 is accurate enough to be used to approximate the curve portion 424, the system again determines if a longer straight line segment 430 may be used to approximate a larger curve portion 424 and 428 as shown in FIG. 6D. If either of the error vectors $e_2$ or $e_3$ for the longer line segment 430 exceeds the test magnitude, the result of decision 314 in FIG. 5B will be YES. In that event, the longer line segment 430 is not used and the system approximates the current curve portion by a straight line segment drawn between the two end points 422 and 416 in block 316 in FIG. 5C as previously described. The system then applies the Forward Step Operator to the function f(t) in block 318 in order to analyze the next portion of the curve using end point 416 as the current position for the function f(t). The system decrements the value of the variable, nsteps, in block 320, but uses the step size from the previous subdivided curve portion 424. The function f(t) now represents the next portion 428 of the Bézier curve.

On the other hand, if both the error vectors $e_2$ and $e_3$ for the line segment 426 are less than the test magnitude, the result of decision 306 in FIG. 5A is NO. In decision 313, the system then checks to see if the last operator applied was the Adjust Down Operator. If so, the result of decision 313 is YES and the system will not check a longer line segment since the longer line segment was previously determined to be inaccurate. Instead, the system moves to block 316 to generate the line segment for the current curve portion. If the Adjust Down Operator was not the last operator applied, the result of decision 313 is NO. In that event, the system will test further to see if the longer straight line segment 430 can be used to approximate a larger portion of the curve 400. In FIG. 6D, the Adjust Down Operator was not the last operator applied, thus the result of decision 313 is NO. The curve portions 424 and 428 could be approximated by the line segment 430 if the line segment is sufficiently accurate. If the magnitude of error vectors $e_2$ and $e_3$ for the double-sized curve portion are both less than the test magnitude, the result of decision 314 in FIG. 5B will be NO. The system will check to determine if the line segment is one that would be derived by recursive subdivision.

Figure 6E:
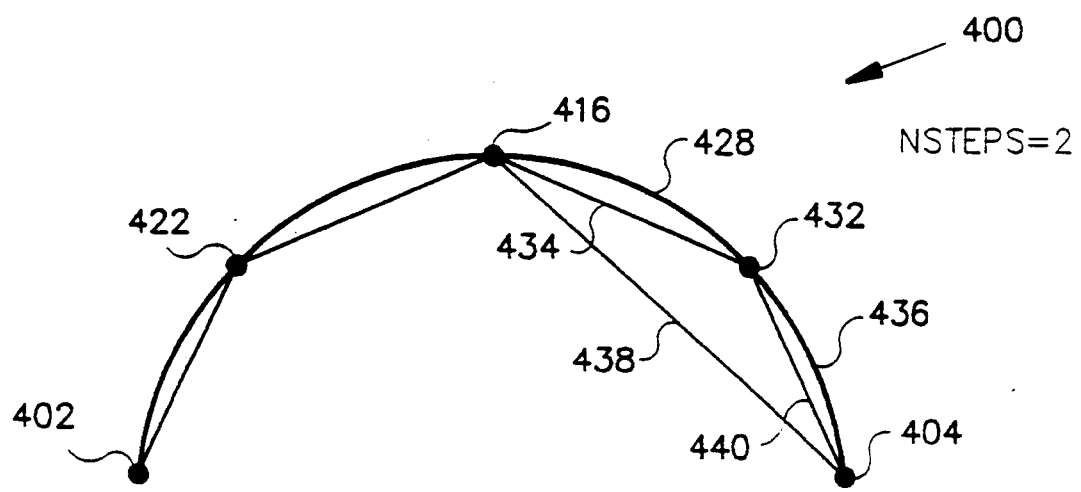
FIG. 6E illustrates the curve of FIG. 6C and the acceptance of a line segment according to the principles of the present invention.

The present invention performs this check by keeping track of the number of steps already taken in rendering the Bézier curve. If the number of steps is even, then the resulting Bézier control points would be the same as those derived from the recursive subdivision technique. But, recursive subdivision would not derive the same line segments if the value of nsteps is odd. In FIG. 5B, decision 326 tests to see if the value of nsteps is even or odd. If nsteps is odd, the result of decision 326 is NO, and the system passes control to block 316 in FIG. 5C to generate the line segment for the current portion of the curve rather than for the double-sized curve portion. The value of the variable, nsteps, is three in FIG. 6D. Therefore, the system will not use the line segment 430 to approximate the curve portions 424 and 428 since the recursive subdivision would not use that line segment. Instead the system will use line segment 426, which has already been tested for accuracy, to approximate the curve portion 424. The Forward Step Operator will be applied to the function f(t) to move the current position to the point 416 and the value of the variable, nsteps, will be decremented to two. The function f(t) now defines the curve portion 428, as shown in FIG. 6E.

The system repeats the above-described tests for the error vectors $e_2$ and $e_3$ for the curve portion 428. If either of the error vectors $e_2$ or $e_3$ exceeds the test magnitude, the system will apply the Adjust Down Operator as described above. If both error vectors $e_2$ and $e_3$ are less than the test magnitude, the system will test to determine if a larger line segment can be used to approximate a larger curve portion. As shown in FIG. 6E, the line segment 438 can be used to approximate the curve portions 428 and 436 if error vectors $e_2$ and $e_3$ are both less than the test magnitude and if the line segment is one that would be derived using recursive subdivision. The system calculates the error in the same manner described above. If the magnitude of either error vector exceeds the test magnitude, the result of decision 314 in FIG. 5B will be YES. The system will not use the longer line segment 438 to approximate the curve portions 428 and 436. Instead, the system uses line segment 434 to approximate the curve portion 428. However, if the magnitudes of both error vectors are less than the test magnitude, the result of decision 314 will be NO. If nsteps is even, the result of decision 326 is YES, and block 328 doubles the step size by applying the Adjust Up Operator to the function. The function now represents a double-sized portion of the Bézier curve. The value of nsteps is divided in half in block 330, to indicate that the increased step size halves the number of steps required to reach the Bézier end point from the current position on the Bézier curve. The present embodiment of the system returns control to block 304 in FIG. 5A for calculation of the error vectors for the larger step size. Note that the system could return control to decision 314 since it has already determined in decision 314 that the error vectors for the double sized curve portion do not exceed the test magnitude. Thus, the system looks at an ever larger curve portion until the error vectors for a larger curve portion exceed the test magnitude. Since the value of the variable, nsteps, is two in FIG. 6E, the line segment 438 is one that would be derived by recursive subdivision. Therefore, the system will use the line segment 438 to approximate the curve segments 428 and 436 if the error vectors $e_2$ and $e_3$ are both less than the test magnitude.

According to the principles of the present invention, only line segments that would be derived by recursive subdivision are utilized to approximate a Bézier curve. This approach to the problem of rendering a Bézier curve allows the curve to be rendered from either direction. That is, a Bézier curve may be rendered from either end and the same line segments will be used to render the curve. Systems of the prior art will render different curves if the order of the Bézier control points is reversed. This anomaly creates difficulty when creating a curve because the system of the prior art is limited to rendering a curve in a single direction. The same is true when erasing an already existing Bézier curve. Systems of the prior art can only erase a Bézier curve in the same direction in which the curve was created. Again, this restriction is avoided by using the principles of the present invention which will render the Bézier curve from either direction.

It should be noted that the application of the hybrid forward differencing basis to Bézier curves allows the curve to be rendered more quickly than with previous techniques. One could forgo the benefit of rendering a curve from either direction, and use the hybrid forward differencing basis to render the curve in only a single direction. It is also clear that one skilled in the art could use as an error criterion, any function of the error vectors that becomes small if and only if all N-1 error vectors in an Nth order Bézier curve become small. For example, instead of the magnitude of the error vectors, one could look at the magnitude of any N-1 linearly independent combinations of the N-1 error vectors.

By following the flowchart described above, the system calculates the smallest set of line segments that can be used to approximate a Bézier curve and still utilize the same line segments that would be derived using the well known recursive subdivision method. The system calculates the line segments in a computationally efficient manner by minimizing the number of subdivisions that are required to render the curve. This is in contrast to the prior art technique of AFD where the Bézier curve is always subdivided until the line segments are each one pixel in length even if fewer subdivisions would provide an acceptable approximation of the Bézier curve.

Figure 7:
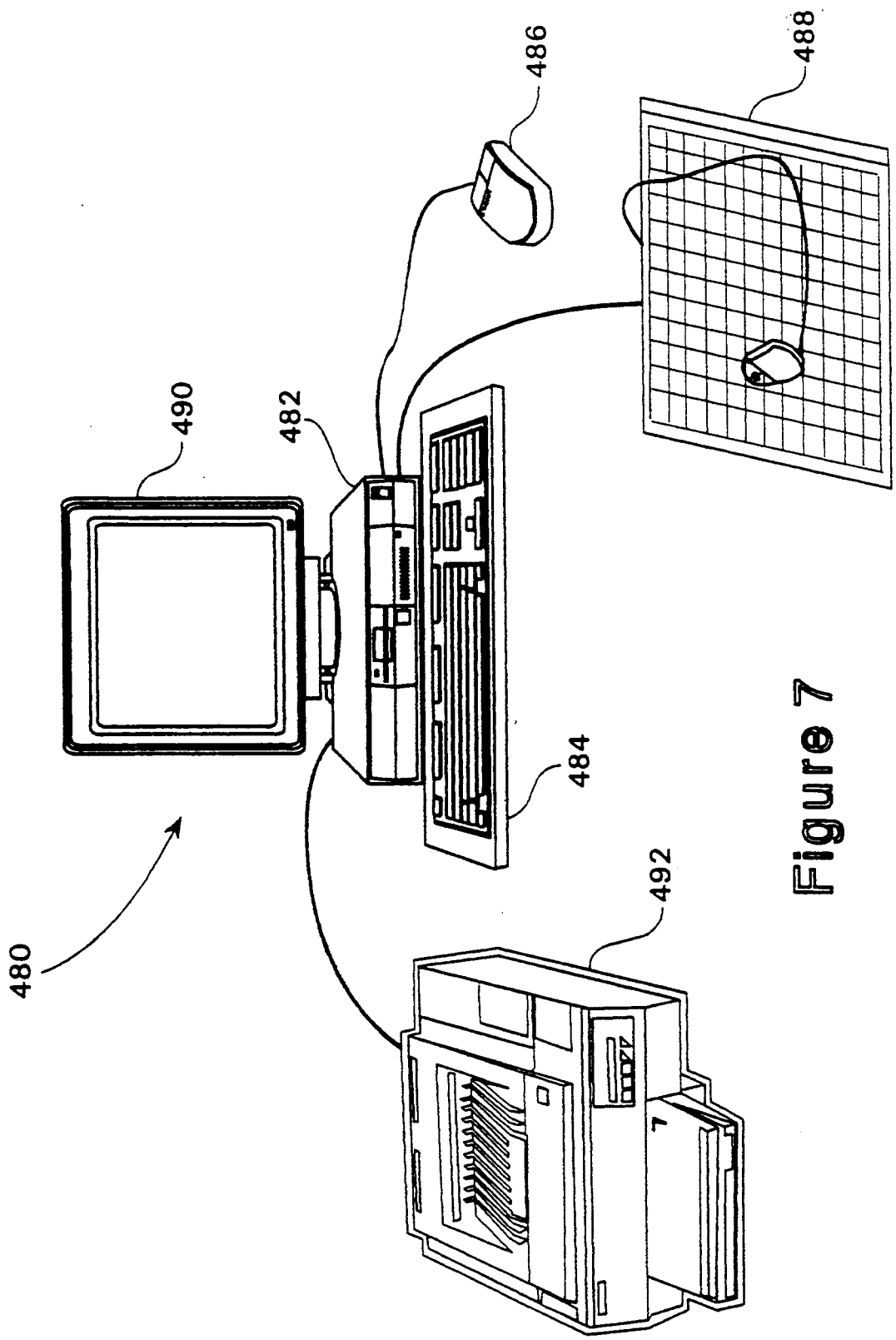
FIG. 7 illustrates a typical computer system implementing the present invention.

The system of the present invention is embodied in a computer system 480 shown in FIG. 7. The main computer box 482 typically contains the central processing unit, system memory, mass storage units such as a disk drive, and the various I/O interfaces. The computer system has a keyboard 484 to input data and control computer activity. As with many graphics computers, the computer system also has a mouse 486 and a digitizing pad 488 to enter graphics data into the computer. The mouse 486 and digitizing pad 488 are used with a variety of application programs to create complex graphics objects. The system of the present invention accepts the input data generated by devices such as the keyboard 484, mouse 486 and digitizing pad 488. The data is processed by the present invention to generate graphic displays on a variety of graphic output devices such as a video display terminal 490, a laser printer 492 or the like. The line segments generated on an output device are the result of the process performed by the present invention.

Figure 8:
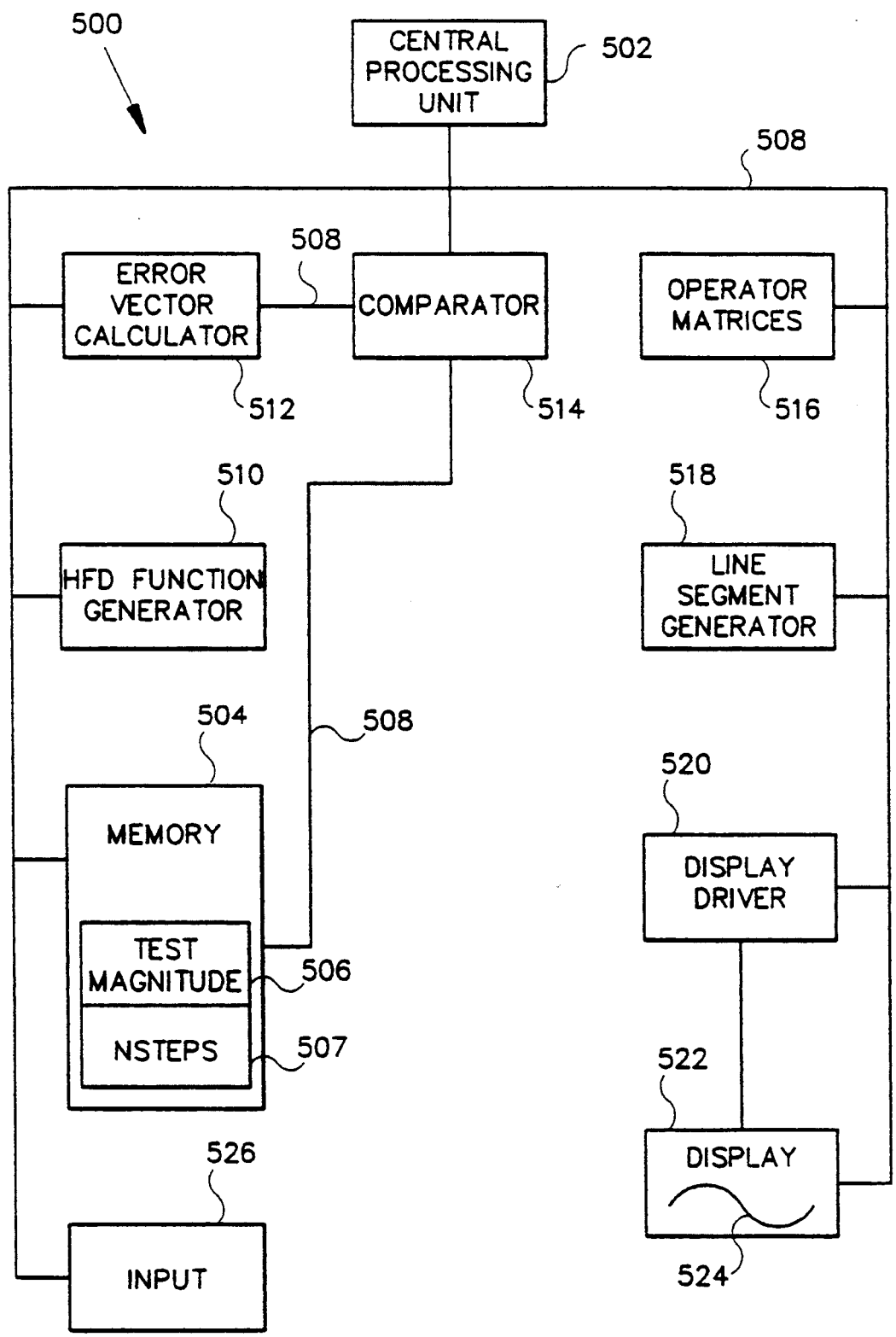
FIG. 8 is a functional diagram of the computer system of FIG. 7 practicing the present invention.

The system 500 incorporating the present invention is shown in a functional block diagram in FIG. 8. The system 500 is controlled by a central processing unit (CPU) 502 which is connected to a memory 504 via a bus 508. The bus 508 also connects the CPU 502 to the other components of the system 500 and interconnects certain of these components as shown in FIG. 7. A test magnitude 506 may be stored in the system main memory 504 or any other suitable storage location. A Hybrid Forward Differencing (HFD) function generator 510 calculates the mathematical function for the Bézier curve using the hybrid forward differencing basis, described above. The function initially defines the entire Bézier curve, and the value of a variable, nsteps 507, is initialized to one to reflect that fact. The value nsteps 507 can be stored in the system main memory 504 or any suitable storage location. As the function is operated on by appropriate operators, the step size may be altered. The value of nsteps 507 is altered correspondingly. As portions of the Bézier curve are rendered, the value of nsteps 507 changes to reflect the number of steps required for the function to reach the end point of the Bézier curve at the present step size. An error vector calculator 512 uses certain terms of the function calculated by the HFD function generator 510. The error vectors are used as a measure of the amount of error in the line segment approximation of the Bézier curve. A comparator 514 compares the magnitude of each error vector term generated by the error vector calculator 512 with the test magnitude 506. The value of the test magnitude 506, which may vary depending on the resolution of the particular output device, can also be stored within the system main memory 504 or any other suitable storage location. If any of the error vector terms exceeds the test magnitude 506, the Adjust Down Operator, using operator matrix 516, causes the function to divide the step size in half, and the HFD function generator 510 evaluates the function for the decreased step size. The operator matrix 516 also alters the value of nstep 507 each time the Bézier curve is divided, as previously described. This process continues until all of the error vector terms generated by the error vector calculator 512 are less than the test magnitude 506.

When the comparator 514 indicates that all of the error vector terms are less than the test magnitude 506, the two Bézier end points are given to a line segment generator 518, which generates a straight line segment drawn between the two Bézier end points. The data points generated by the line segment generator 518 are given to a display driver 520 which processes the data into the appropriate format for the particular display. Finally, the formatted data is transferred to a display 522, such as a CRT, a laser printer, or the like, which displays a line segment approximation 524 of the Bézier curve.

The Bézier control points stored in memory 504 may be obtained from a wide variety of sources such as a conventional application package, a digitizing unit, or the like. All of these sources are generically represented by an input 526.

If the comparator 514 determines that all error vector terms generated by the error vector calculator 512 are less than the test magnitude, the operator matrix 516 applies the Adjust Up Operator, using operator matrix 516, to cause the function to double the step size. If the error vector terms generated by the error vector calculator 512 for the double-sized step are all less than the test magnitude 506, the system 500 will use the larger step size, but only if the line segment is one that would be derived by the recursive subdivision techniques. Otherwise, the system 500 will use the smaller step size and proceed to render the next portion of the Bézier curve.

The system 500 of the present invention uses equations similar to those previously described as used for AFD, but the system of the present invention manipulates the equations to express them in the HFD scaled error basis. The system 500 uses a scaled error basis that results in a simple Forward Step Operator, and that is easy to evaluate at time, t=0, and results in error vectors that are easy to derive. By utilizing the HFD scaled error basis instead of the AFD basis, error vectors may be determined. The determined error vectors are indicative of the degree of accuracy with which straight line segments approximate the Bézier curve.

In summary, it should be noted that the foregoing describes the rendering a cubic Bézier curve according to the principles of the present invention. The principles of the present invention are equally applicable to a Bézier curve of any order. The only difference between a cubic Bézier curve and a Bézier curve of any other order is the number of error vectors that are generated. A cubic Bézier curve has two error vectors while a fourth order Bézier curve will have three error vectors. The magnitude of all three vectors must be less than the test magnitude or the system will subdivide the curve. If the magnitude of all three error vectors are less than the test magnitude, the system will draw a straight line segment between the end points of the Bézier curve to approximate the curve. If the magnitudes of any of the error vectors exceeds the test magnitude, the system will apply the Adjust Down Operator to decrease the step size. When the magnitudes of the error vectors are all less than the test magnitude, the system will generate a line segment to approximate that portion of the Bé zier curve and apply the Forward Step Operator to move the current position of the function. If a larger line segment may be used to approximate a larger portion of the Bézier curve, the system will apply the Adjust Up Operator only if the larger line segment is one that would be used by the prior art recursive subdivision. Thus, a Bézier curve can be rendered in a highly efficient manner that results in the same line segments as the well-known recursive subdivision method, allowing the rendered curve to be erased in either direction.

It is to be understood that even though numerous embodiments and advantages of the present invention have been set forth in the foregoing description, the above disclosure is illustrative only, and changes may be made in detail yet remain within the broad principles of the present invention. Therefore, the present invention is to be limited only by the appended claims.

We claim:

1. A computer system for approximating a Bézier curve with at least a line segment, comprising:
   (a) input means for inputting first, second, third, and fourth sequential Bézier control points defining a cubic Bézier curve;
   (b) means for selecting a test magnitude indicative of a desired degree of accuracy with which the line segment should approximate said Bézier curve;

(c) means for determining a hybrid forward differencing function based on said first, second, third, and fourth sequential inputted Bézier control points;

(d) size means for selecting a step size, where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said first inputted Bézier control point to said fourth inputted Bézier control point;

(e) error means for determining a first error vector and a second error vector from said hybrid forward differencing function based on said selected step size;

(f) means for comparing the magnitude of said first error vector and said second error vector with said test magnitude, and indicating if the magnitude of either said first error vector or said second error vector exceeds said test magnitude or if the magnitudes of both said first and said second error vector are less than said test magnitude; and (g) line means for generating a straight line segment between said present position and said end point to approximate said Bézier curve in response to an indicator signal.

2. The system of claim 1, further including:

(h) first alteration means for altering said hybrid forward differencing function to decrease said step size taken by said hybrid forward differencing function if said comparing means indicates that the magnitude of either said first or said second error vector exceeds said test magnitude, said first alteration means generating a first operated function defining a subdivided portion of said Bézier curve extending from said present position to a new end point defined by said decreased step size, and providing said first operated function for processing by said error means, and generating said indicator signal if the magnitudes of said first and said second error vectors are both less than said test magnitude.

3. The system of claim 2, further including:

(i) second alteration means for altering said hybrid forward differencing function to increase said step size taken by said hybrid forward differencing function, upon said line step generating a straight line without the intervening application of said first alteration means, if the magnitudes of said first and said second error vectors are both less than said test magnitude, said second alteration means generating a second operated function defining a portion of said Bézier curve larger than said subdivided portion and extending from said present position to an increased end point defined by said increased step size; and (j) matching means for determining if an increased straight line segment extending between said present position and said increased end point would be approximated by recursive subdivision, generating said indicator signal if the magnitude of either said first or said second error vector determined from said second operated function exceeds said test magnitude or if said matching means determines that said increased straight line segment would not be derived by said recursive subdivision, and providing said line means with said present position and said increased end point and generating said indicator signal to generate said increased straight line segment if the magnitudes of said first and said second error vectors determined from said second operated function are both less than said test magnitude and said matching means determines that said increased straight line segment would be derived by said recursive subdivision.

4. The system according to claim 1 wherein said means for comparing the magnitudes of said first and second error vectors with said test magnitude includes:

means for determining and selecting the vector components with the largest magnitude for said first and said second error vectors; and means for comparing the magnitudes of said selected vector component of said first and second error vectors with said test magnitude, and indicating if the magnitude of said selected vector component of either said first or said second error vector exceeds said test magnitude or if the magnitudes of both of said selected vector components are less than said test magnitude.

5. A computer system for approximating a Bézier curve with at least a line segment, comprising:

(a) input means for inputting first, second, third, and fourth sequential Bézier control points defining a cubic Bézier curve;

(b) means for selecting a test magnitude indicative of a desired degree of accuracy with which the line segment should approximate said Bézier curve;

(c) means for determining a hybrid forward differencing function based on said first, second, third, and fourth sequential inputted Bézier control points, said function having four terms, $e_0$ through $e_3$, and having the following general form:

$$f(t) = e_0 E_0(t) + e_1 E_1(t) + e_2 E_2(t) + e_3 E_3(t);$$

(d) size means for selecting a step size, where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said first inputted Bézier control point to said fourth inputted Bézier control point;

(e) error means for determining a first error vector and a second error vector from said hybrid forward differencing function based on said selected step size, said first and second error vectors being $e_2$ and $e_3$, respectively;

(f) means for comparing the magnitude of said first error vector and said second error vector with said test magnitude, and indicating if the magnitude of either said first error vector or said second error vector exceeds said test magnitude or if the magnitudes of both said first and said second error vector are less than said test magnitude; and (g) line means for generating a straight line segment between said present position and said end point to approximate said Bézier curve in response to an indicator signal.

6. The system of claim 5, further including:

(h) first alteration means for altering said hybrid forward differencing function to decrease said step size taken by said hybrid forward differencing function if said comparing means indicates that the magnitude of either said first or said second error vector exceeds said test magnitude, said first alteration means generating a first operated function defining a subdivided portion of said Bézier curve extending from said present position to a new end point defined by said decreased step size, and providing said first operated function for processing by said error meats, and generating said indicator signal if the magnitudes of said first and said second error vectors are both less than said test magnitude.

7. The system of claim 6, further including:

(i) second alteration means for altering said hybrid forward differencing function to increase said step size taken by said hybrid forward differencing function, upon said forward step means altering said hybrid forward differencing function without the intervening application of said first alteration means, if the magnitudes of said first and said second error vectors are both less than said test magnitude, said second alteration means generating a second operated function defining a portion of said Bézier curve larger than said subdivided portion and extending from said present position to an increased end point defined by said increased step size; and (j) matching means for determining if an increased straight line segment extending between said present position and said increased end point would be approximated by recursive subdivision, generating said indicator signal if the magnitude of either said first or said second error vector determined from said second operated function exceeds said test magnitude or if said matching means determines that said increased straight line segment would not be derived by said recursive subdivision, and providing said line means with said present position and said increased end point and generating said indicator signal to generate said increased straight line segment if the magnitudes of said first and said second error vectors determined from said second operated function are both less than said test magnitude and said matching means determines that said increased straight line segment would be derived by said recursive subdivision.

8. The system according to claim 5 wherein said means for comparing the magnitudes of said first and second error vectors with said test magnitude includes:

means for determining and selecting the vector components with the largest magnitude for said first and said second error vectors; and means for comparing the magnitudes of said selected vector component of said first and second error vectors with said test magnitude, and indicating if the magnitude of said selected vector component of either said first or said second error vector exceeds said test magnitude or if the magnitudes of both of said selected vector components are less than said test magnitude.

9. A computer system for approximating a Bézier curve with at least a line segment, comprised of:

(a) input means for inputting a variable number, N, of sequential Bézier control points, $P_1 \ldots P_N$, defining a Bézier curve of degree N-1;

(b) means for selecting a test magnitude indicative of a desired degree of accuracy with which the line segment should approximate said Bézier curve;

(c) means for determining a hybrid forward differencing function based on said N sequential inputted Bézier control points;

(d) size means for selecting a step size, where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said Bézier control point $P_1$ to said Bézier control point $P_N$;

(e) error means for determining a set of N-2 error vectors, $E_1 \ldots E_{N-2}$, from said hybrid forward differencing function based on said selected step size;

(f) means for comparing the magnitudes of each of said N-2 error vectors with said test magnitude, and indicating if the magnitude of any of said N-2 error vectors exceeds said test magnitude or if the magnitude of each of said N-2 error vectors is less than said test magnitude; and (g) line means for generating a straight line segment between said present position and said end point to approximate said Bézier curve in response to an indicator signal.

10. The system of claim 9, further including:

(h) first alteration means for altering said hybrid forward differencing function to decrease said step size taken by said hybrid forward differencing function if said comparing means indicates that the magnitude of any of said N-2 error vectors exceeds said test magnitude, said first alteration means generating a first operated function defining a subdivided portion of said Bézier curve extending from said present position to a new end point defined by said decreased step size, and providing said first operated function for processing by said error means, and generating said indicator signal if the magnitude of each of said N-2 error vectors is less than said test magnitude.

11. The system of claim 10, further including:

(i) second alteration means for altering said hybrid forward differencing function to increase said step size taken by said hybrid forward differencing function, upon said forward step means altering said hybrid forward differencing function without the intervening application of said first alteration means, if the magnitudes of said N-2 error vectors are each less than said test magnitude, said second alteration means generating a second operated function defining a portion of said Bézier curve larger than said subdivided portion and extending from said present position to an increased end point defined by said increased step size; and (j) matching means for determining if an increased straight line segment extending between said present position and said increased end point would be approximated by recursive subdivision, generating said indicator signal if any of said N-2 error vectors determined from said second operated function exceeds said test magnitude or if said matching means determines that said increased straight line segment would not be derived by said recursive subdivision, and providing said line means with said present position and said increased end point and generating said indicator signal to generate said increased straight line segment if the magnitudes of each of said N-2 error vectors determined from said second operated function are less than said test magnitude and said matching means determines that said increased straight line segment would be derived by said recursive subdivision.

12. The system according to claim 9 wherein said means for comparing the magnitudes of said N-2 error vectors with said test magnitude includes:
   means for resolving the vector components of said N-2 error vectors; and
   means for comparing the magnitudes of said resolved components of said N-2 error vectors with said test magnitude, and indicating if the magnitude of any of said resolved vector components of said N-2 error vectors exceeds said test magnitude or if the magnitude of each of said resolved vector components of said N-2 error vectors is less than said test magnitude.

13. A computer system for approximating a Bézier curve with at least a line segment, comprised of:
   (a) input means for inputting a variable number, N, of sequential Bézier control points, $P_1 \ldots P_N$, defining a Bézier curve of degree N-1;
   (b) means for selecting a test magnitude indicative of a desired degree of accuracy with which the line segment should approximate said Bézier curve;
   (c) means for determining a hybrid forward differencing function based on said N sequential inputted Bézier control points;
   (d) size means for selecting a step size, where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said Bézier control point $P_1$ to said Bézier control point $P_N$;
   (e) error means for determining a set of N-2 error functions based on a set of N-2 error vectors, $E_1 \ldots E_{N-2}$, from said hybrid forward differencing function based on said selected step size;
   (f) means for comparing the magnitudes of each of said N-2 error functions with said test magnitude, and indicating if the magnitude of any of said N-2 error functions exceeds said test magnitude or if the magnitude of each of said N-2 error functions is less than said test magnitude; and
   (g) line means for generating a straight line segment between said present position and said end point to approximate said Bézier curve in response to an indicator signal.

14. A computer system for approximating a Bézier curve with at least a line segment, comprised of:
   (a) input means for inputting a variable number, N, of sequential Bézier control points, $P_1 \ldots P_N$, defining a Bézier curve of degree N-1;
   (b) means for selecting a test magnitude indicative of a desired degree of accuracy with which the line segment should approximate said Bézier curve;
   (c) means for determining a hybrid forward differencing function based on said N sequential inputted Bézier control points, said function having N terms, $e_0$ through $e_{N-1}$, and having the following general form:

$$f(t) = e_0 E_0(t) + e_1 E_1(t) + e_2 E_2(t) + \ldots e_{N-1} E_{N-1}(t);$$

(d) size means for selecting a step size, where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said Bézier control point $P_1$ to said Bézier control point $P_N$;
   (e) error means for determining a set of N-2 error vectors, $E_1 \ldots E_{N-2}$, from said hybrid forward differencing function based on based on said selected step size, said N-2 error vectors being $e_2$ through $e_{N-1}$, respectively;
   (f) means for comparing the magnitudes of each of said N-2 error vectors with said test magnitude, and indicating if the magnitude of any of said N-2 error vectors exceeds said test magnitude or if the magnitude of each of said N-2 error vectors is less than said test magnitude; and
   (g) line means for generating a straight line segment between said present position and said end point to approximate said Bézier curve in response to an indicator signal.

15. The system of claim 14, further including:
   (h) first alteration means for altering said hybrid forward differencing function to decrease said step size taken by said hybrid forward differencing function if said comparing means indicates that the magnitude of any of said N-2 error vectors exceeds said test magnitude, said first alteration means generating a first operated function defining a subdivided portion of said Bézier curve extending from said present position to a new end point defined by said decreased step size, and providing said first operated function for processing by element e, and generating said indicator signal if the magnitude of each of said N-2 error vectors is less than said test magnitude.

16. The system of claim 15, further including:
   (i) second alteration means for altering said hybrid forward differencing function to increase said step size taken by said hybrid forward differencing function, upon said forward step means altering said hybrid forward differencing function without the intervening application of said first alteration means, if the magnitudes of said N-2 error vectors are each less than said test magnitude, said second alteration means generating a second operated function defining a portion of said Bézier curve larger than said subdivided portion and extending from said present position to an increased end point defined by said increased step size; and
   (j) matching means for determining if an increased straight line segment extending between said present position and said increased end point would be approximated by recursive subdivision, generating said indicator signal if any of said N-2 error vectors determined from said second operated function exceeds said test magnitude or if said matching means determines that said increased straight line segment would not be derived by said recursive subdivision, and providing said line means with said present position and said increased end point and generating said indicator signal to generate said increased straight line segment if the magnitudes of each of said N-2 error vectors determined from said second operated function are less than said test magnitude and said matching means determines that said increased straight line segment would be derived by said recursive subdivision.

17. The system according to claim 14 wherein said means for comparing the magnitudes of said N-2 error vectors with said test magnitude includes:

means for resolving the vector components of said N-2 error vectors; and means for comparing the magnitude of at least the largest of said resolved components of said N-2 error vectors with said test magnitude, and indicating if the magnitude of any of said resolved vector components of said N-2 error vectors exceeds said test magnitude or if the magnitude of each of said resolved vector components of said N-2 error vectors is less than said test magnitude.

18. A computer system for generating the same straight line segments that recursive subdivision generate to approximate a Bézier curve using a test magnitude indicative of a desired degree to accuracy with which the line segments should approximate the curve, the system comprised of:

(a) input means for inputting a variable number, N, of sequential Bézier control points, $P_1 \ldots P_N$, defining a Bézier curve of degree N-1, with Bézier control points $P_1$ and $P_N$ being end points that coincide with the curve;

(b) means for determining a hybrid forward differencing function based on said N sequential inputted Bézier control points;

(c) error means for selecting a step size, where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said Bézier control point $P_1$ to said Bézier control point $P_N$;

(d) error means for determining a set of N-2 error vectors, $E_1 \ldots E_{N-2}$, from said hybrid forward differencing function, based on said selected step size:

(e) first alteration means for altering said hybrid forward differencing function to decrease said step size taken by said hybrid forward differencing function if the magnitude of any of said N-2 error vectors exceeds the test magnitude, said first alteration means generating a first operated function defining a subdivided portion of said Bézier curve extending from said present position to a new end point defined by said decreased step size, and providing said first operated function for processing by said error means;

(f) line means for generating a straight line segment between said present position and said end point to approximate said Bézier curve in response to an indicator signal;

(g) forward step means for altering said hybrid forward differencing function upon said line means generating a straight line, said forward step means generating a forward operated function defining a subdivided portion of said Bézier curve by moving said present position of said hybrid forward differencing function to said end point defined by said step size without altering said step size and providing said forward operated function for processing by element d;

(h) second alteration means for altering said hybrid forward differencing function to increase said step size taken by said hybrid forward differencing function, upon said forward step means altering said hybrid forward differencing function without the intervening application of said first alteration means, if the magnitudes of said N-2 error vectors are each less than said test magnitude, said second alteration means generating a second operated function defining a portion of said Bézier curve larger than said subdivided portion and extending from said present position to an increased end point defined by said increased step size;

(i) matching means for determining if an increased straight line segment extending between said present position and said increased end point would be approximated by the recursive subdivision, and providing said second operated function for processing by element d if the magnitudes of each of said N-2 error vectors determined from said second operated function are each less than the test magnitude and if said increased straight line segment would be derived by the recursive subdivision, and generating said indicator signal if any of said N-2 error vectors determined from said second operated function exceeds the test magnitude or if said matching means determines that said increased straight line segment extending between said present position and said increased end point would not be derived by the recursive subdivision; and (j) comparing means for comparing the magnitudes of each of said N-2 error vectors with the test magnitude, and generating said indicator signal if the magnitude of each of said N-2 error vectors is less than the test magnitude and said first alteration means was the most recently applied of said first and second alteration means.

19. The system according to claim 18 wherein said comparing means includes:

means for resolving the vector components of said N-2 error vectors; and means for comparing the magnitude of at least the largest of said resolved components of said N-2 error vectors with said test magnitude, and generating said indicator signal if the magnitude of each of said resolved vector components of said N-2 error vectors is less than said test magnitudes and said first alteration was the most recently applied of said first and second alteration means.

20. A computer system for generating a straight line segment to approximate a Bézier curve, the system comprised of:

a central processor:

a memory, connected to said central processor via a bus carrying electrical data and control signals;

an input unit by which a first, second, third, and fourth sequential Bézier control points defining a cubic Bézier curve may be entered into said memory via said bus;

a test magnitude indicative of a desired degree of accuracy with which the line segment should approximate said Bézier curve:

a hybrid forward differencing generator connected to said bus generating a hybrid forward differencing function based on said first, second, third, and fourth sequential inputted Bézier control points;

size means for selecting a step size where said hybrid forward differencing function defines a portion of said Bézier curve from a present position of said hybrid forward differencing function to an end point defined by said step size, said size means selecting an initial value for said selected step size, said step size having an initial step value so that said hybrid forward differencing function initially defines the entire Bézier curve from said first Bézier control point to said fourth Bézier control point;

a set of operators connected to said bus operating on said hybrid forward differencing function to decrease said step size so that said hybrid forward differencing function represents a smaller portion of said Bézier curve and doubling said step value indicating that it takes twice as many steps for said hybrid forward differencing function to reach said end point of said Bézier curve, to increase said step size so that said hybrid forward differencing function represents a larger portion of said Bézier curve and halving said step value indicating that it takes half as many steps for said hybrid forward differencing function to reach said end point of said Bézier curve, or take a forward step at the present step size so that the current position of said hybrid forward differencing function is incremented by said present step size and decrementing said step value indicating that said hybrid forward differencing function has taken one step, at the present step size toward said end point of said Bézier curve;

an error vector calculator connected to said bus determining a first and second error vectors from said hybrid forward differencing function;

a comparator comparing the value of said test magnitude with the value of the magnitude of said first and said second error vectors and indicating if the magnitude of either said first or said second error vector exceeds said test magnitude or if the magnitudes of both said first and said second error vectors are less than said test magnitude;

a line segment generator receiving said present position and said end point and, upon receiving an indicator signal, generating a plurality of data values corresponding to pixels to create a line segment drawn between said present position and said end point;

a display driver receiving said plurality of data points and converting said data points into a display format; and a display receiving said converted data points and generating an image corresponding to said line segment drawn between said present position and said end point to approximate at least a portion of said Bézier curve.

21. The system of claim 20 wherein said set of operators applies a first of said set of operators to said hybrid forward differencing function to decrease said step size creating an operated hybrid forward differencing function that represents a smaller portion of said Bézier curve and providing said operated hybrid forward differencing function to said error vector calculator if said comparator indicates that the magnitude of either said first or said second error vectors exceeds said test magnitude and generating said indicator signal if the magnitudes of said first and said second error vectors are both less than said test magnitude.

22. The system of claim 21 wherein said set of operators, upon said line segment generator generating a straight line without an intervening application of said first operator, applies a second of said set of operators to said hybrid forward differencing function to increase said step size creating a second operated hybrid forward differencing function that represents a larger portion of said Bézier curve extending between said present position and an increased end point defined by said step size, generating said indicator signal if the magnitude of either said first or said second error vectors determined from said second operated function exceeds said test magnitude or if said step value is odd, and providing said line segment generator with said present position and said increased end point and generating said indicator signal to generate an increased straight line segment extending between said present position and said increased end point if the magnitudes of said first and said second error vectors determined from said second operated function are both less than said test magnitude and said step value is even.

23. The system according to claim 20 wherein said comparator compares the magnitude of at least the largest of the resolved vector components of said first and said second error vectors with said test magnitude and indicates if the magnitude of any of the resolved vector components of said first and said second error vectors exceeds said test magnitude or if the magnitudes of the resolved vector components of both said first and said second error vectors are less than said test magnitude.

24. A computer system for generating a straight line segment to approximate a Bézier curve, the system comprised of:

a central processor:

a memory, connected to said central processor via a bus carrying electrical data and control signals;

an input unit by which a first, second, third, and fourth sequential Bézier control points defining a cubic Bézier curve may be entered into said memory via said bus;

a test magnitude indicative of a desired degree of accuracy with which the line segment should approximate said Bézier curve;

a hybrid forward differencing generator connected to said bus generating a hybrid forward differencing function based on said first, second, third, and fourth sequential inputted Bézier control points, said function having four terms, $e_0$ through $e_3$, and having the following general form:

$$f(t) = e_0 E_0(t) + e_1 E_1(t) + e_2 E_2(t) + e_3 E_3(t);$$

size means for selecting a step size where said hybrid forward differencing function defines a portion of said Bézier curve from a present position of said hybrid forward differencing function to an end point defined by said step size, said size means selecting an initial value for said selected step size, so that said hybrid forward differencing function initially defines the entire Bézier curve from said first Bézier control point to said fourth Bézier control point;

a set of operators connected to said bus operating on said hybrid forward differencing function to decrease said step size so that said hybrid forward differencing function represents a smaller portion of said Bézier curve and doubling said step value indicating that it takes twice as many steps for said hybrid forward differencing function to reach said end point of said Bézier curve, to increase said step size so that said hybrid forward differencing function represents a larger portion of said Bézier curve and halving said step value indicating that it takes half as many steps for said hybrid forward differencing function to reach said end point of said Bézier curve, or take a forward step at the present step size so that the current position of said hybrid forward differencing function is incremented by said present step size and decrementing said step value indicating that said hybrid forward differencing function has taken one step, at the present step size toward said end point of said Bézier curve:

an error vector calculator connected to said bus determining a first error vector and a second error vector from said hybrid forward differencing function based on said selected step size, said first and second error vectors being $e_2$ and $e_3$, respectively;

a comparator comparing the value of said test magnitude with the value of the magnitude of said first and said second error vectors and indicating if the magnitude of either said first or said second error vector exceeds said test magnitude or if the magnitudes of both said first and said second error vectors are less than said test magnitude;

a line segment generator receiving said present position and said end point and, upon receiving an indicator signal, generating a plurality of data values corresponding to pixels to create a line segment drawn between said present position and said end point;

a display driver receiving said plurality of data points and converting said data points into a display format; and a display receiving said converted data points and generating an image corresponding to said line segment drawn between said present position and said end point to approximate at least a portion of said Bézier curve.

25. The system of claim 24 wherein said set of operators applies a first of said set of operators to said hybrid forward differencing function to decrease said step size creating an operated hybrid forward differencing function that represents a smaller portion of said Bézier curve and providing said operated hybrid forward differencing function to said error vector calculator if said comparator indicates that the magnitude of either said first or said second error vectors exceeds said test magnitude and generating said indicator signal if the magnitudes of said first and said second error vectors are both less than said test magnitude.

26. The system of claim 25 wherein said set of operators, upon said line segment generator generating a straight line without an intervening application of said first operator, applies a second of said set of operators to said hybrid forward differencing function to increase said step size creating a second operated hybrid forward differencing function that represents a larger portion of said Bézier curve extending between said present position and an increased end point defined by said step size, generating said indicator signal if the magnitude of either said first or said second error vectors determined from said second operated function exceeds said test magnitude or if said step value is odd, and providing said line segment generator with said present position and said increased end point and generating said indicator signal to generate an increased straight line segment extending between said present position and said increased end point if the magnitudes of said first and said second error vectors determined from said second operated function are both less than said test magnitude and said step value is even.

27. The system according to claim 24 wherein said comparator compares the magnitude of at least the largest of the resolved vector components of said first and said second error vectors with said test magnitude and indicates if the magnitude of any of the resolved vector components of said first and said second error vectors exceeds said test magnitude or if the magnitudes of the resolved vector components of both said first and said second error vectors are less than said test magnitude.

28. A computer system for generating a straight line segment to approximate a Bézier curve, the system comprised of:

a central processor:

a memory, connected to said central processor via a bus carrying electrical data and control signals;

an input unit by which a variable number, N, of sequential Bézier control points, $P_1 \ldots P_N$, defining a Bézier curve of degree N-1 may be entered into said memory via said bus;

a test magnitude indicative of a desired degree of accuracy with which the line segment should approximate said Bézier curve;

a hybrid forward differencing generator connected to said bus generating a hybrid forward differencing function based on said N sequential inputted Bézier control points;

size means for selecting a step size where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said Bézier control point $P_1$ to said Bézier control point $P_N$;

a set of operators connected to said bus operating on said hybrid forward differencing function to decrease said step size so that said hybrid forward differencing function represents a smaller portion of said Bézier curve and doubling said step value indicating that it takes twice as many steps for said hybrid forward differencing function to reach said end point of said Bézier curve, to increase said step size so that said hybrid forward differencing function represents a larger portion of said Bézier curve and halving said step value indicating that it takes half as many steps for said hybrid forward differencing function to reach said end point of said Bézier curve, or take a forward step at the present step size so that the current position of said hybrid forward differencing function is incremented by said present step size and decrementing said step value indicating that said hybrid forward differencing function has taken one step, at the present step size toward said end point of said Bézier curve;

an error vector calculator connected to said bus and determining a set of N-2 error vectors from said hybrid forward differencing function;

a comparator comparing the value of said test magnitude with the value of the magnitude of each of said N-2 error vectors and indicating if the magnitude of any of said N-2 error vectors exceeds said test magnitude or if the magnitudes of said N-2 error vectors are each less than said test magnitude;

a line segment generator receiving said present position and said end point and, upon receiving an indicator signal, generating a plurality of data values corresponding to pixels to create a line segment drawn between said present position and said end point;

a display driver receiving said plurality of data points and converting said data points into a display format; and a display receiving said converted data points mad generating an image corresponding to said line segment drawn between said present position and said end point to approximate at least a portion of said Bézier curve.

29. The system of claim 28 wherein said set of operators applies a first of said set of operators to said hybrid forward differencing function to decrease said step size creating an operated hybrid forward differencing function that represents a smaller portion of said Bézier curve and providing said operated hybrid forward differencing function to said error vector calculator if said comparator indicates that the magnitude of any of said N-2 error vectors exceeds said test magnitude and generating said indicator signal if the magnitude of each of said N-2 error vectors is less than said test magnitude.

30. The system of claim 29 wherein said set of operators, upon said line segment generator generating a straight line without an intervening application of said first operator, applies a second of said set of operators to said hybrid forward differencing function to increase said step size creating a second operated hybrid forward differencing function that represents a larger portion of said Bézier curve extending between said present position and an increased end point defined by said step size, generating said indicator signal if the magnitude of any of said N-2 error vectors determined from said second operated function exceeds said test magnitude or if said step value is odd, and providing said line segment generator with said present position and said increased end point and generating said indicator signal to generate an increased straight line segment extending between said present position and said increased end point if the magnitudes of each of said N-2 error vectors determined from said operated function are less than said test magnitude and said step value is even.

31. The system according to claim 28 wherein said comparator compares the magnitude of at least the largest of the resolved vector components of said N-2 error vectors with said test magnitude and indicates if the magnitude of any of the resolved vector components of said N-2 error vectors exceeds said test magnitude or if the magnitudes of the resolved vector components of said N-2 error vectors are each less than said test magnitude.

32. A computer system for generating a straight line segment to approximate a Bézier curve, the system comprised of:

a central processor;

a memory, connected to said central processor via a bus carrying electrical data and control signals;

an input unit by which a variable number, N, of sequential Bézier control points. $P_1 \ldots P_N$, defining a Bézier curve of degree N-1 may be entered into said memory via said bus;

a test magnitude indicative of a desired degree of accuracy with which the line segment should approximate said Bézier curve:

a hybrid forward differencing generator connected to said bus generating a hybrid forward differencing function based on said based on said N sequential inputted Bézier control points, said function having N terms, $e_0$ through $e_{N-1}$, and having the following general form:

$$f(t) = e_0 E_0(t) + e_1 E_1(t) + e_2 E_2(t) + \ldots e_{N-1} E_{N-1}(t);$$

size means for selecting a step size where said hybrid forward differencing function defines a portion of said Bézier curve from a present position of said hybrid forward differencing function to an end point defined by said step size, so that said hybrid forward differencing function initially defines the entire Bézier curve from said Bézier control point $P_1$ to said Bézier control point $P_N$;

a set of operators connected to said bus operating on said hybrid forward differencing function to decrease said step size so that said hybrid forward differencing function represents a smaller portion of said Bézier curve and doubling said step value indicating that it takes twice as many steps for said hybrid forward differencing function to reach said end point of said Bézier curve, to increase said step size so that said hybrid forward differencing function represents a larger portion of said Bézier curve and halving said step value indicating that it takes half as many steps for said hybrid forward differencing function to reach said end point of said Bézier curve, or take a forward step at the present step size so that the current position of said hybrid forward differencing function is incremented by said present step size and decrementing said step value indicating that said hybrid forward differencing function has taken one step, at the present step size toward said end point of said Bézier curve;

an error vector calculator connected to said bus and determining a set of N-2 error vectors from said hybrid forward differencing function based on said selected step size, said N-2 error vectors being $e_2$ through $e_{N-1}$, respectively from said hybrid forward differencing function;

a comparator comparing the value of said test magnitude with the value of the magnitude of each of said N-2 error vectors and indicating if the magnitude of any of said N-2 error vectors exceeds said test magnitude or if the magnitudes of said N-2 error vectors are each less than said test magnitude;

a line segment generator receiving said present position and said end point and, upon receiving an indicator signal, generating a plurality of data values corresponding to pixels to create a line segment drawn between said present position and said end point;

a display driver receiving said plurality of data points and converting said data points into a display format; and a display receiving said converted data points and generating an image corresponding to said line segment drawn between said present position and said end point to approximate at least a portion of said Bézier curve.

33. The system of claim 32 wherein said set of operators applies a first of said set of operators to said hybrid forward differencing function to decrease said step size creating an operated hybrid forward differencing function that represents a smaller portion of said Bézier curve and providing said operated hybrid forward differencing function to said error vector calculator if said comparator indicates that the magnitude of any of said N-2 error vectors exceeds said test magnitude.

34. The system of claim 33 wherein said set of operators, upon said line segment generator generating a straight line without an intervening application of said first operator, applies a second of said set of operators to said hybrid forward differencing function to increase said step size creating a second operated hybrid forward differencing function that represents a larger portion of said Bézier curve extending between said present position and an increased end point defined by said step size, generating said indicator signal if the magnitude of any of said N-2 error vectors determined from said second operated function exceeds said test magnitude or if said step value is odd, and providing said line segment generator with said present position and said increased end point and generating said indicator signal to generate an increased straight line segment extending between said present position and said increased end point if the magnitudes of each of said N-2 error vectors determined from said second operated function are less than said test magnitude and said step value is even.

35. The system according to claim 32 wherein said comparator compares the magnitude of at least the largest of the resolved vector components of said N-2 error vectors with said test magnitude and indicates if the magnitude of any of the resolved vector components of said N-2 error vectors exceeds said test magnitude or if the magnitudes of the resolved vector components of said N-2 error vectors are each less than said test magnitude.

36. A computer system for generating a straight line segment to approximate a Bézier curve, the system comprised of:
 a central processor;
 a memory, connected to said central processor via a bus carrying electrical data and control signals;
 an input unit by which a variable number, N, of sequential Bézier control points, $P_1 \ldots P_N$, defining a Bézier curve of degree N-1 may be entered into said memory via said bus;
 a test magnitude indicative of a desired degree of accuracy with which the line segment should approximate said Bézier curve;
 a hybrid forward differencing generator connected to said bus generating a hybrid forward differencing function based on said N sequential inputted Bézier control points;
 size means for selecting a step size where said hybrid forward differencing function defines a portion of said Bézier curve from a present position of said hybrid forward differencing function to an end point defined by said step size, said size means selecting an initial value for said selected step size so that said hybrid forward differencing function initially defines the entire Bézier curve from said Bézier control point $P_1$ to said Bézier control point $P_N$;
 a set of operators connected to said bus operating on said hybrid forward differencing function to decrease said step size so that said hybrid forward differencing function represents a smaller portion of said Bézier curve and doubling said step value indicating that it takes twice as many steps for said hybrid forward differencing function to reach said end point of said Bézier curve, to increase said step size so that said hybrid forward differencing function represents a larger portion of said Bézier curve and halving said step value indicating that it takes half as many steps for said hybrid forward differencing function to reach said end point of said Bézier curve, or take a forward step at the present step size so that the current position of said hybrid forward differencing function is incremented by said present step size and decrementing said step value indicating that said hybrid forward differencing function has taken one step, at the present step size toward said end point of said Bézier curve;
 an error vector calculator connected to said bus and determining a set of N-2 error functions from a set of N-2 error vectors from said hybrid forward differencing function:
 a comparator comparing the value of said test magnitude with the value of the magnitude of each of said N-2 error functions and indicating if the magnitude of any of said N-2 error functions exceeds said test magnitude or if the magnitudes of said N-2 error functions are each less than said test magnitude;
 a line segment generator receiving said present position and said end point and, upon receiving an indicator signal, generating a plurality of data values corresponding to pixels to create a line segment drawn between said present position and said end point;
 a display driver receiving said plurality of data points and converting said data points into a display format; and
 a display receiving said converted data points and generating an image corresponding to said line segment drawn between said present position and said end point to approximate at least a portion of said Bézier curve.

37. A method of generating a straight line segment to approximate a Bézier curve, the method comprising the steps of:
 (a) inputting first, second, third, and fourth sequential Bézier control points defining a cubic Bézier curve;
 (b) selecting a test magnitude indicative of a desired degree of accuracy with which the line segment should approximate said Bézier curve;
 (c) determining a hybrid forward differencing function based on said first, second, third, and fourth sequential inputted Bézier control points;
 (d) selecting a step size, where said hybrid forward differencing function defines a portion of said Bézier curve from a present position of said hybrid forward differencing function to an end point defined by said selected step size, said step (d) selecting an initial value for said selected step size so that said hybrid forward differencing function initially defines the entire Bézier curve from said first inputted Bézier control point to said fourth inputted Bézier control point;
 (e) determining a first error vector from said hybrid forward differencing function based on said selected step size;
 (f) determining a second error vector from said hybrid forward differencing function based on said selected step size;

(g) comparing the magnitude of said first error vector with said test magnitude, and indicating if the magnitude of said first error vector exceeds said test magnitude or if the magnitude said first error vector is less than said test magnitude;

(h) comparing the magnitude of said second error vector with said test magnitude, and indicating if the magnitude of said second error vector exceeds said test magnitude or if the magnitude said second error vector is less than said test magnitude; and (i) generating a straight line segment between said current position and said end point to approximate at least a portion of said Bézier curve portion upon receiving an indicator signal.

38. The method of claim 37, further including the step of:

(j) altering said hybrid forward differencing function to decrease said step size taken by said hybrid forward differencing function if said steps of comparing said first and second error vectors with said test magnitude indicates that the magnitude of either said first or said second error vector exceeds said test magnitude or generating said indicator signal if said steps of comparing indicates that the magnitudes of said first and said second error vectors are both less than said test magnitude;

(k) generating a first operated function defining a subdivided portion of said Bézier curve extending from said present position to a new end point defined by said decreased step size; and (l) providing said first operated function for processing by steps e–i.

39. The method of claim 38, further including the steps of:

(m) altering said hybrid forward differencing function to increase the step size taken by said hybrid forward differencing function, upon step i generating a straight line without an intervening application of steps j–l, if said steps of comparing said first and second error vectors with said test magnitude indicates that the magnitude of both said first and said second error vectors are less than said test magnitude;

(n) generating a second operated function defining a portion of said Bézier curve larger than said subdivided portion and extending from said present position to an increased end point defined by said increased step size;

(o) generating said indicator signal if the magnitudes of either said first and said second error vectors determined from said second operated function exceeds said test magnitude;

(p) determining if an increased straight line segment extending between said present position and said increased end point would be derived by recursive subdivision; and (q) generating said indicator signal if said increased line segment would not be derived by said recursive subdivision, or providing said present position and said increased end point for processing by step i and generating said indicator signal if the magnitudes of said first and second error vectors determined from said second operated function are both less than said test magnitude and said increased line segment would be derived by said recursive subdivision.

40. The method according to claim 37 wherein the steps g and h of comparing the magnitudes of said first and second error vectors with said test magnitude and using a drawn line segment includes the steps of:

determining and selecting the vector component of said first error vector with the largest magnitude;

determining and selecting the vector component of said second error vector with the largest magnitude;

comparing the magnitude of said selected vector component of said first error vector with said test magnitude and indicating if the magnitude of said selected vector component of said first error vector exceeds said test magnitude or if the magnitude of said selected vector component of said first error vector is less than said test magnitude; and comparing the magnitude of said selected vector component of said second error vector with said test magnitude and indicating if the magnitude of said selected vector component of said second error vector exceeds said test magnitude or if the magnitude of said selected vector component of said second error vector is less than said test magnitude.

41. A method of generating a straight line segment to approximate a Bézier curve, the method comprising the steps of:

(a) inputting first, second, third, and fourth sequential Bézier control points defining a cubic Bézier curve;

(b) selecting a test magnitude indicative of a desired degree of accuracy with which the line segment should approximate said Bézier curve;

(c) determining a hybrid forward differencing function based on said first, second, third, and fourth sequential inputted Bézier control points, said function having four terms, $e_0$ through $e_3$, and having the following general form:

$$f(t) = e_0 E_0(t) + e_1 E_1(t) = e_2 E_2(t) + e_3 E_3(t);$$

(d) selecting a step size, where said hybrid forward differencing function defines a portion of said Bézier curve from a present position of said hybrid forward differencing function to an end point defined by said selected step size, said step (d) selecting an initial value for said selected step size so that said hybrid forward differencing function initially defines the entire Bézier curve from said first inputted Bézier control point to said fourth inputted Bézier control point;

(e) determining a first error vector from said hybrid forward differencing function based on said selected step size, said first error vector being $e_2$;

(f) determining a second error vector from said hybrid forward differencing function based on said selected step size, said second error vector being $e_3$;

(g) comparing the magnitude of said first error vector with said test magnitude, and indicating if the magnitude of said first error vector exceeds said test magnitude or if the magnitude said first error vector is less than said test magnitude;

(h) comparing the magnitude of said second error vector with said test magnitude, and indicating if the magnitude of said second error vector exceeds said test magnitude or if the magnitude said second error vector is less than said test magnitude; and (i) generating a straight line segment between said current position and said end point to approximate at least a portion of said Bézier curve portion upon receiving an indicator signal.

42. The method of claim 41, further including the step of:
(j) altering said hybrid forward differencing function to decrease said step size taken by said hybrid forward differencing function if said steps of comparing said first and second error vectors with said test magnitude indicates that the magnitude of either said first or said second error vector exceeds said test magnitude or generating said indicator signal if said steps of comparing indicates that the magnitudes of said first and said second error vectors are both less than said test magnitude;
(k) generating a first operated function defining a subdivided portion of said Bézier curve extending from said present position to a new end point defined by said decreased step size: and
(l) providing said first operated function for processing by steps e–i.

43. The method of claim 42, further including the steps of:
(m) altering said hybrid forward differencing function to increase said step size taken by said hybrid forward differencing function, upon step i generating a straight line without an intervening application of steps j–l, if said steps of comparing said first and second error vectors with said test magnitude indicates that the magnitude of both said first and said second error vectors are less than said test magnitude:
(n) generating a second operated function defining a portion of said Bézier curve larger than said subdivided portion and extending from said present position to an increased end point defined by said increased step size;
(o) generating said indicator signal if the magnitudes of either said first and said second error vectors determined from said second operated function exceeds said test magnitude;
(p) determining if an increased straight line segment extending between said present position and said increased end point would be derived by recursive subdivision; and
(q) generating said indicator signal if said increased line segment would not be derived by said recursive subdivision, or providing said present position and said increased endpoint for processing by step i and generating said indicator signal if the magnitudes of said first and second error vectors determined from said second operated function are both less than said test magnitude and said increased line segment would be derived by said recursive subdivision.

44. The method according to claim 41 wherein the steps g and h of comparing the magnitudes of said first and second error vectors with said test magnitude and using a drawn line segment includes the steps of:
determining and selecting the vector component of said first error vector with the largest magnitude;
determining and selecting the vector component of said second error vector with the largest magnitude;
comparing the magnitude of said selected vector component of said first error vector with said test magnitude and indicating if the magnitude of said selected vector component of said first error vector exceeds said test magnitude or if the magnitude of said selected vector component of said first error vector is less than said test magnitude; and
comparing the magnitude of said selected vector component of said second error vector with said test magnitude and indicating if the magnitude of said selected vector component of said second error vector exceeds said test magnitude or if the magnitude of said selected vector component of said second error vector is less than said test magnitude.

45. A method of generating a straight line segment to approximate a Bézier curve, the method comprising the steps of:
(a) inputting a variable number, N, of sequential Bézier control points, $P_1 \ldots P_N$ defining a Bézier curve of degree N-1;
(b) selecting a test magnitude indicative of a desired degree of accuracy with which the line segment should approximate said Bézier curve;
(c) determining a hybrid forward differencing function based on said N sequential inputted Bézier control points;
(d) selecting a step size, where said hybrid forward differencing function defines a portion of said Bézier curve from a present position of said hybrid forward differencing function to an end point defined by said selected step size, said step (d) selecting an initial value for said selected step size so that said hybrid forward differencing function initially defines the entire Bézier curve from said Bézier control point $P_1$ to said Bézier control point $P_N$;
(e) determining a set of N-2 error vectors, $E_1 \ldots E_{N-2}$, from said hybrid forward differencing function based on said selected step size;
(f) comparing the magnitudes of each of said N-2 error vectors with said test magnitude, and indicating if the magnitude of any of said N-2 error vectors exceeds said test magnitude or if the magnitude of each of said N-2 error vectors is less than said test magnitude; and
(g) generating a straight line segment between said present position and said end point to approximate at least a portion of said Bézier curve upon receiving an indicator signal.

46. The method of claim 45, further including the steps of:
(h) altering said hybrid forward differencing function to decrease said step size taken by said hybrid forward differencing function if said step of comparing the magnitude of said N-2 error vectors with said test magnitude indicates that the magnitude of any of said N-2 error vectors exceeds said test magnitude or generating said indicator signal if said steps of comparing indicates that the magnitude of each of said N-2 error vectors is less than said test magnitude;
(i) generating a first operated function defining a subdivided portion of said Bézier curve extending from said present position to a new end point defined by said decreased step size; and
(j) providing said first operated function for processing by steps e–g.

47. The method of claim 46, further including the steps of:
(k) altering said hybrid forward differencing function to increase said step size taken by said hybrid forward differencing function, upon step g generating a straight line without an intervening application of steps h–j, if said comparing means indicates that the magnitudes of said N-2 error vectors are each less than said test magnitude;

(l) generating a second operated function defining a portion of said Bézier curve larger than said subdivided portion and extending from said present position to an increased end point defined by said increased step size;

(m) generating said indicator signal if the magnitudes of any of said N-2 error vectors determined from said second operated function exceeds said test magnitude;

(n) determining if an increased straight line segment extending between said present position and said increased end point would be derived by recursive subdivision; and (o) generating said indicator signal if said increased line segment would not be derived by said recursive subdivision, or providing said present position and said increased endpoint for processing by step g and generating said indicator signal if the magnitudes of each of said N-2 error vectors determined from said second operated function are each less than said test magnitude and said increased line segment would be derived by said recursive subdivision.

48. The method according to claim 45 wherein the step of comparing the magnitudes of said N-2 error vectors with said test magnitude includes the steps of:

determining and selecting the vector component with the largest magnitude for each of said N-2 error vectors;

comparing the magnitude of said selected vector component of each of said N-2 error vectors with said test magnitude; and indicating if the magnitude of said selected vector component of any of said N-2 error vectors exceeds said test magnitude or if the magnitudes of said selected component for each of said N-2 error vectors is less than said test magnitude.

49. A method of generating a straight line segment to approximate a Bézier curve, the method comprising the steps of:

(a) inputting a variable number, N, of sequential Bézier control points, $P_1 \ldots P_N$ defining a Bézier curve of degree N-1;

(b) selecting a test magnitude indicative of a desired degree of accuracy with which the line segment should approximate said Bézier curve;

(c) determining a hybrid forward differencing function based on said N sequential inputted Bézier control points:

(d) selecting a step size, where said hybrid forward differencing function defines a portion of said Bézier curve from a present position of said hybrid forward differencing function to an end point defined by said selected step size, said step (d) selecting an initial value for said selected step size so that said hybrid forward differencing function initially defines the entire Bézier curve from said Bézier control point $P_1$ to said Bézier control point $P_N$;

(e) determining a set of N-2 error functions from a set of N-2 error vectors, $E_1 \ldots E_{N-2}$, from said hybrid forward differencing function based on said selected step size;

(f) comparing the magnitudes of each of said N-2 error functions with said test magnitude, and indicating if the magnitude of any of said N-2 error functions exceeds said test magnitude or if the magnitude of each of said N-2 error functions is less than said test magnitude; and (g) generating a straight line segment between said present position and said end point to approximate at least a portion of said Bézier curve upon receiving an indicator signal.

50. A method of generating a straight line segment to approximate a Bézier curve, the method comprising the steps of:

(a) inputting a variable number, N, of sequential Bézier control points, $P_1 \ldots P_N$ defining a Bézier curve of degree N-1;

(b) selecting a test magnitude indicative of a desired degree of accuracy with which the line segment should approximate said Bézier curve of degree N-1;

(c) determining a hybrid forward differencing function based on said sequential inputted Bézier control points, said function having N terms, $e_0$ through $e_{N-1}$, and having the following general form:

$$f(t) = e_0 E_0(t) + e_1 E_1(t) + e_2 E_2(t) + \ldots e_{N-1} E_{N-1}(t);$$

(d) selecting a step size, where said hybrid forward differencing function defines a portion of said Bézier curve from a present position of said hybrid forward differencing function to an end point defined by said selected step size, said step (d) selecting an initial value for said selected step size so that said hybrid forward differencing function initially defines the entire Bézier curve from said Bézier control point $P_1$ to said Bézier control point $P_N$;

(e) determining a set of N-2 error vectors, $E_1 \ldots E_{N-2}$, from said hybrid forward differencing function, said N-2 error vectors being $e_2$ through $e_{N-1}$, respectively from said hybrid forward differencing function;

(f) comparing the magnitudes of each of said N-2 error vectors with said test magnitude, and indicating if the magnitude of any of said N-2 error vectors exceeds said test magnitude or if the magnitude of each of said N-2 error vectors is less than said test magnitude; and (g) generating a straight line segment between said present position and said end point to approximate at least a portion of said Bézier curve upon receiving an indicator signal.

51. The method of claim 50, further including the steps of:

(h) altering said hybrid forward differencing function to decrease said step size taken by said hybrid forward differencing function if said step of comparing the magnitude of said N-2 error vectors with said test magnitude indicates that the magnitude of any of said N-2 error vectors exceeds said test magnitude or generating said indicator signal if said steps of comparing indicates that the magnitude of each of said N-2 error vectors is less than said test magnitude;

(i) generating a first operated function defining a subdivided portion of said Bézier curve extending from said present position to a new end point defined by said decreased step size; and (j) providing said first operated function for processing by steps e–g.

52. The method of claim 51, further including the steps of:

(k) altering said hybrid forward differencing function to increase said step size taken by said hybrid forward differencing function, upon step g generating a straight line without an intervening application of steps h–j, if said comparing means indicates that the magnitudes of said N-2 error vectors are each less than said test magnitude;

(l) generating a second operated function defining a portion of said Bézier curve larger than said subdivided portion and extending from said present position to an increased end point defined by said increased step size;

(m) generating said indicator signal if the magnitudes of any of said N-2 error vectors determined from said second operated function exceeds said test magnitude;

(n) determining if an increased straight line segment extending between said present position and said increased end point would be derived by recursive subdivision; and (o) generating said indicator signal if said increased line segment would not be derived by said recursive subdivision, or providing said present position and said increased endpoint for processing by step g and generating said indicator signal if the magnitudes of each of said N-2 error vectors determined from said second operated function are each less than said test magnitude and said increased line segment would be derived by said recursive subdivision.

53. The method according to claim 50 wherein the step of comparing the magnitudes of said N-2 error vectors with said test magnitude includes the steps of:

determining and selecting the vector component with the largest magnitude for each of said N-2 error vectors;

comparing the magnitude of said selected vector component of each of said N-2 error vectors with said test magnitude; and indicating if the magnitude of said selected vector component of any of said N-2 error vectors exceeds said test magnitude or if the magnitudes of said selected component for each of said N-2 error vectors is less than said test magnitude.

54. A method for generating the same straight line segments that recursive subdivision generate to approximate a Bézier curve using a test magnitude indicative of a desired degree of accuracy with which the line segments should approximate the curve, the method comprising the steps of:

(a) inputting a variable number, N, of sequential Bézier control points, $P_1 \ldots P_N$, defining a Bézier curve of degree N-1, with Bézier control points $P_1$ and $P_N$ being end points that coincide with the curve;

(b) determining a hybrid forward differencing function based on said N sequential inputted Bézier control points:

(c) selecting a step size, where said hybrid forward differencing function defines a portion of said Bézier curve from a present position of said hybrid forward differencing function to an end point defined by said selected step size, said step (c) selecting an initial value for said selected step size so that said hybrid forward differencing function initially defines the entire Bézier curve from said Bézier control point $P_1$ to said Bézier control point $P_N$;

(d) determining a set of N-2 error vectors, $E_1 \ldots E_{N-2}$, from said hybrid forward differencing function based on said selected step size;

(e) comparing the magnitudes of each of said N-2 error vectors with the test magnitude, and indicating if the magnitude of any of said N-2 error vectors exceeds the test magnitude or if the magnitude of each of said N-2 error vectors is less than the test magnitude;

(t) altering said hybrid forward differencing function to decrease said step size taken by said hybrid forward differencing function if said step of comparing indicates that the magnitude of any of said N-2 error vectors exceeds the test magnitude or generating an indicator signal if each of said N-2 error vectors is less than the test magnitude;

(g) generating an first operated function defining a subdivided portion of said Bézier curve extending from said present position to a new end point defined by said decreased step size;

(h) providing said first operated function for processing by steps d, e and i;

(i) generating a straight line segment between said present position and said end point to approximate at least a portion of said Bézier curve upon receiving said indicator signal;

(j) altering said hybrid differencing function to take a forward step if step i has generated a straight line;

(k) generating a forward operated function defining a subdivided portion of said Bézier curve by moving said present position of said hybrid forward differencing function to said end point without altering said step size;

(l) providing said forward operated function for processing by steps a, d and e;

(m) altering said hybrid forward differencing function to increase the step size taken by said hybrid forward differencing function, upon generating said forward operated function without an intervening application of said first operated function, if said step of comparing indicates that the magnitudes of said N-2 error vectors are each less than the test magnitude;

(n) generating a second operated function defining a portion of said Bézier curve larger than said subdivided portion and extending from said present position to an increased end point defined by said increased step size;

(o) generating said indicator signal if the magnitudes of any of said N-2 error vectors determined from said second operated function exceeds said test magnitude;

(p) determining if an increased straight line segment extending between said present position and said increased end point would be derived by recursive subdivision; and (q) generating said indicator signal if said increased line segment would not be derived by said recursive subdivision, or providing said second operated function for processing by steps d and e if the magnitudes of each of said N-2 error vectors calculated from said second operated function are each less than the test magnitude and if said increased line segment would be derived by said recursive subdivision.

55. The method according to claim 54 wherein the step of comparing the magnitudes of said N-2 error vectors with the test magnitude includes the steps of:
- determining and selecting the vector component with the largest magnitude for each of said N-2 error vectors;
- comparing the magnitude of said selected vector component of each of said N-2 error vectors with said test magnitude; and
- indicating if the magnitude of said selected vector component of any of said N-2 error vectors exceeds the test magnitude or if the magnitudes of said selected component for each of said N-2 error vectors is less than the test magnitude.

* * * * *